(12) United States Patent
Reynolds et al.

(10) Patent No.: US 7,428,439 B1
(45) Date of Patent: Sep. 23, 2008

(54) WIRELESS FOOT CONTROL SYSTEM WITH OPTICAL TRANSMITTER AND TRANSCEIVER

(75) Inventors: Charles A. Reynolds, West Haven, CT (US); Gary L. Argraves, Newtown, CT (US)

(73) Assignee: Linemaster Switch Corporation, Woodstock, CT (US)

( * ) Notice: Subject to any disclaimer, the term of this patent is extended or adjusted under 35 U.S.C. 154(b) by 815 days.

(21) Appl. No.: 11/035,203

(22) Filed: Jan. 13, 2005

(51) Int. Cl.
| G05B 11/01 | (2006.01) |
| G05B 15/00 | (2006.01) |
| H02P 1/00  | (2006.01) |
| H02P 1/04  | (2006.01) |
| H02P 3/00  | (2006.01) |
| H02P 25/18 | (2006.01) |
| H02P 5/00  | (2006.01) |
| H02P 7/00  | (2006.01) |
| H01H 3/22  | (2006.01) |

(52) U.S. Cl. .................. 700/17; 700/83; 318/400.18; 318/551

(58) Field of Classification Search ............ 700/17, 700/83; 318/400.18, 551
See application file for complete search history.

(56) References Cited

U.S. PATENT DOCUMENTS

| 4,839,533 A   | 6/1989  | Aga ........................ 307/140 |
| 5,039,973 A * | 8/1991  | Carballo .................. 338/153 |
| 5,043,594 A * | 8/1991  | Carballo .................. 307/31 |
| 5,108,389 A   | 4/1992  | Cosmescu ................. 606/10 |
| 5,247,449 A * | 9/1993  | Yoshida .................... 700/136 |
| 5,359,448 A   | 10/1994 | Laszlo et al. .............. 359/180 |
| 5,442,343 A   | 8/1995  | Cato et al. ................. 340/825.35 |
| 5,555,120 A   | 9/1996  | Telymonde et al. ........ 359/147 |
| 5,568,859 A   | 10/1996 | Levy et al. ................ 200/43.01 |
| 5,635,777 A   | 6/1997  | Telymonde et al. ........ 307/119 |
| 5,838,131 A   | 11/1998 | Telymonde ............... 318/560 |
| 6,013,882 A   | 1/2000  | Boetzkes ................. 200/86.5 |
| 6,054,831 A * | 4/2000  | Moore et al. ............. 318/581 |
| 6,074,388 A   | 6/2000  | Tockweiler et al. ....... 606/34 |
| 6,363,139 B1  | 3/2002  | Zurek et al. .............. 379/56.1 |

(Continued)

OTHER PUBLICATIONS

"Wireless Remote Controls" articles by GAMA Electronics, Inc., Crystal Lake, IL, dated Jan. 1999.

(Continued)

Primary Examiner—Ronald D Hartmann, Jr.
(74) Attorney, Agent, or Firm—Alix, Yale & Ristas, LLP

(57) ABSTRACT

A wireless foot control system includes a receiver and at least one transmitter. The transmitter includes a medium generator for emitting a communication medium, a power supply and at least one foot pedal. The power supply includes a power source, a capacitor bank having a discharge current capacity sufficient to power the medium generator, and a current limiter. The current limiter connects the power source to the capacitor bank, charging the capacitor bank from the power source over a period of time. The foot pedal selectively energizes the medium generator from the capacitor bank. The receiver includes a medium collector for collecting the emitted medium and an electronic circuit. The electronic circuit includes a converter for converting the collected medium to an input control signal and a microprocessor in communication with the converter, the microprocessor having an operating system for generating an output control signal commensurate with the input control signal.

18 Claims, 23 Drawing Sheets

U.S. PATENT DOCUMENTS

| | | | | |
|---|---|---|---|---|
| 6,424,442 | B1 | 7/2002 | Gfeller et al. | 359/152 |
| 7,245,898 | B2* | 7/2007 | Van Bosch et al. | 455/345 |
| 2004/0115591 | A1* | 6/2004 | Warner | 433/98 |
| 2005/0251228 | A1* | 11/2005 | Hamel | 607/60 |
| 2007/0078539 | A1* | 4/2007 | Kuher et al. | 700/90 |
| 2007/0166662 | A1* | 7/2007 | Lint et al. | 433/101 |
| 2007/0254261 | A1* | 11/2007 | Rosenblood et al. | 433/98 |
| 2008/0114387 | A1* | 5/2008 | Hertweck et al. | 606/170 |

OTHER PUBLICATIONS

"New Wireless RF Foot Control" article by R.F. Systems, Inc., Broomfield, CO, dated Nov. 17, 2000.

"Dental Footswitches and Controllers" article by R.F. Systems, Inc., Broomfield, CO, Copyright 1997.

"Wireles Foot-Operated Switches" article by Linemaster Switch Corporation, Woodstock, CT, European Designengineer, Apr. 2001; Asia-Pacific Designengineer, Oct. 2001.

"Precision Begins with a Linemaster Switch" article by Linemaster Switch Corporation, Woodstock, CT, Copyright 2000.

"ableNet" Product Catalog 2002-2003, Minneapolis, MN, pp. 1, 3, 14, 15, 16, 17.

"capaz footswitch" article CAPAZ GmbH, Oberkirch, Germany, dated Sep. 2001.

"Raymote Infrared Remote Control Technology" Bulletin 0495-DT1, by Control Chief Corporation, Bradford, PA, Aug. 1994.

"6312—infra Red Remote Receiver", "6311—InfraRed Remote Controls", "6310—General Purpose Infra Red Remote Control Transmitters" articles by herga at www.herga.com/handcontrols/products, dated Oct. 30, 2002.

"PowerLink Pro Accessories" mailer by R.F. Systems, Inc. of Westminister, CO, Copyright 1999.

"Foot-Operated Controls for medica. Equipment." 93/42/EWG, Article by steute Meditech of Hawthorne, NY, dated Jun. 21, 2000.

* cited by examiner

WIRELESS FOOT CONTROL SYSTEM WITH OPTICAL TRANSMITTER AND TRANSCEIVER

BACKGROUND OF THE INVENTION

This invention relates generally to control units for controlling the operation of associated power driven devices such as medical and dental equipment, power tools, recording equipment, office machines, and motor driven appliances. More particularly, the present invention relates to foot operated control units wherein the control unit is actuated by the foot of the operator to energize, de-energize, or similarly control the operation of an associated power driven device.

Most conventional foot operated control units are connected to the controlled device by a cord or cable that carries the command signal from the control unit to the controlled device or completes the power supply circuit between the control unit and the controlled device. In many applications, the use of a hard-wired connection between the control unit and the controlled device can be inconvenient. For example, the cable and its connectors have a limited number of conductors and pins. This limits the number of control options that can be controlled through the hard-wired connection. In addition, it is generally difficult to change the control functions without cable and/or connector modification. Personnel may trip on an exposed cable. The conductors and/or insulation of exposed cables may be damaged if walked upon. Heavily armored cord sets are unacceptably stiff and bulky for many applications. Cable clutter is unaesthetic and makes "house cleaning" more difficult.

Wireless, radio frequency (RF) control units have become quite common. Perhaps the best known are the RF control units used in wireless local area networks. RF foot operated control units are also known and solve many of the problems found in hard-wired systems. However, the RF signals used by the control units can interfere with the operation of other equipment that is located within the range of the control unit. Conversely, other sources of RF energy may interfere with signal from the RF control unit. Accordingly, RF control units are not appropriate for controlling certain types of controlled equipment, for example medical equipment.

Wireless control units utilizing light wavelengths that are invisible to the human eye, for example infrared (IR) light or ultraviolet (UV) light have also become quite common. For example, IR remote controls have become ubiquitous in the consumer electronics market. Such control units operate on either a line-of-sight (LOS) or non-line-of-sight (NLOS) approach. With a LOS approach, an unobstructed path between the transmitting and receiving points is necessary. LOS is also limited by off-LOS alignment of the transmitter and receiver. However LOS is a simple engineering design, having one transmitter and one receiver, and is the type of approach used by most of the commonly found light control units. With a NLOS approach, obstructions of the media and the alignment issue are virtually eliminated. However, an NLOS approach requires greater sophistication in the design of the transmitter and receiver.

SUMMARY OF THE INVENTION

Briefly stated, the invention in a preferred form is a wireless foot control system which comprises a receiver and at least one transmitter. The transmitter includes a medium generator for emitting a communication medium, a power supply and at least one foot pedal. The power supply includes a power source, a capacitor bank having a discharge current capacity sufficient to power the medium generator, and a current limiter. The current limiter connects the power source to the capacitor bank, charging the capacitor bank from the power source over a period of time. The foot pedal selectively energizes the medium generator from the capacitor bank. The receiver includes a medium collector for collecting the emitted medium and an electronic circuit. The electronic circuit includes a converter for converting the collected medium to an input control signal and a microprocessor in communication with the converter, the microprocessor having an operating system for generating an output control signal commensurate with the input control signal.

The medium generator includes multiple infrared light-emitting diodes, arranged to emit an evenly distributed infrared light wave pattern, and the medium collector includes multiple photodiodes that are active in the infrared wavelength. Preferably, the medium generator is composed of ten infrared light-emitting diodes arranged in a circular pattern and the medium collector is composed of six photodiodes arranged in a circular pattern.

The wireless foot control system includes four or less transmitters.

In addition, the invention is a method for controlling a piece of equipment with a wireless foot control system. The method includes transmitting bounded randomized data packets indicative of actuation of the transmitter by depressing a foot pedal to actuate the transmitter microprocessor. The transmitter operating system generates a control signal for the medium generator, the control signal energizing the medium generator to emit a communication medium defining the data packets. The medium collector of the receiver collects the emitted communication medium. The receiver then examines the data packets for errors and generates an output control signal for valid data packets.

Generating a control signal for the medium generator comprises dividing a 2000 ms cycle time into 32 hop slots by assigning a period base to each hop slot based on a setting of a microprocessor dip switch, generating a random delay for each hop slot, the delay being bounded in a range of the assigned period base, and normalizing the delay. Generating a random delay includes seeding the random generator with a customer code and the assigned station number. The normalized delay is equal to period base of the previous hop slot minus the selected delay period of the previous hop slot plus the selected delay period of the current hop slot.

Examining the data packets for errors comprises examining each data packet for collisions and examining each data packet for validity. Each data packet has a bit period including an active high state followed by a low state gap, the high state and the low state each having a length. Examining a data packet for collisions comprises comparing the high state length to a predetermined length. The transmitter operating system separates each prior data packet from each subsequent data packet with a trailing guard period having a predetermined length. Examining a data packet for collisions also comprises comparing the trailing guard period between each prior data packet and each subsequent data packet with the predetermined trailing guard period length.

The transmitter operating system includes an initialization routine for resetting the transmitter on initial energization, a transmit wait routine for maintaining the transmitter in a wait state until a change in the pedal state is detected, a transmit bit frame routine for transmitting the control signal when the transmit wait routine detects a change in the pedal state, and a test for off routine and a first packet test routine for returning the transmitter to the wait state on completion of transmission of the control signal.

The receiver operating system includes an initialization routine for resetting the receiver on initial energization, a receiver idle routine for maintaining the receiver in a wait state until a "start bit" (low to high transition) is received, a start bit receipt routine, a verification routine, a main receiver routine, an error check routine, and a return to receiver idle routine.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
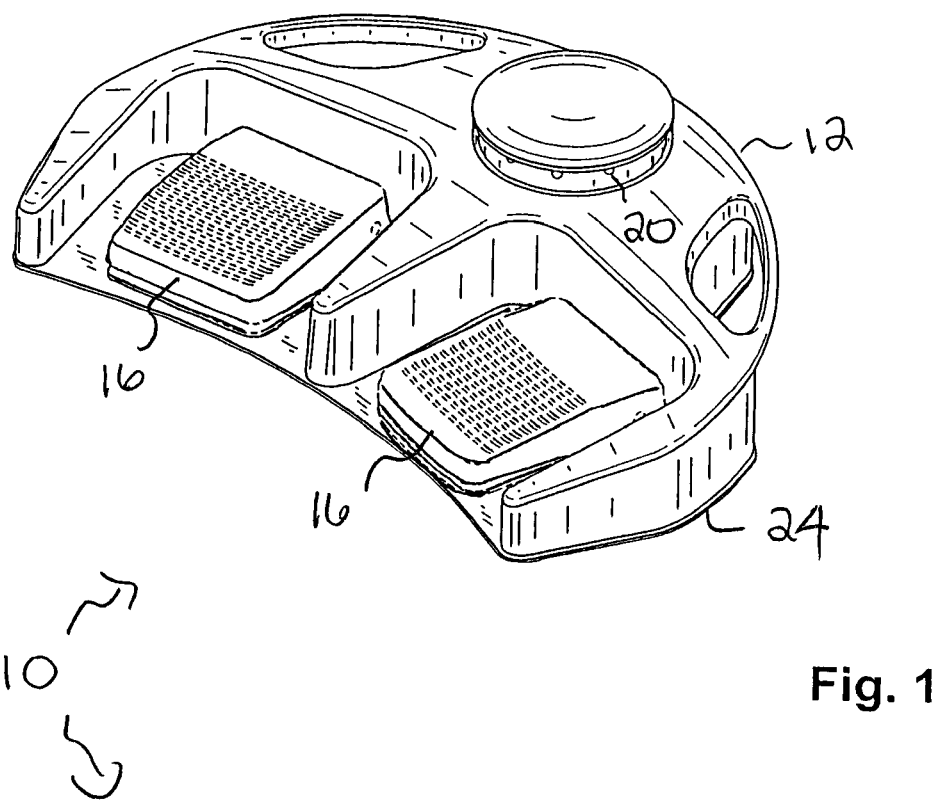
FIG. 1 is a perspective view of a transmitter for a wireless foot control system in accordance with the invention.
Figure 2:
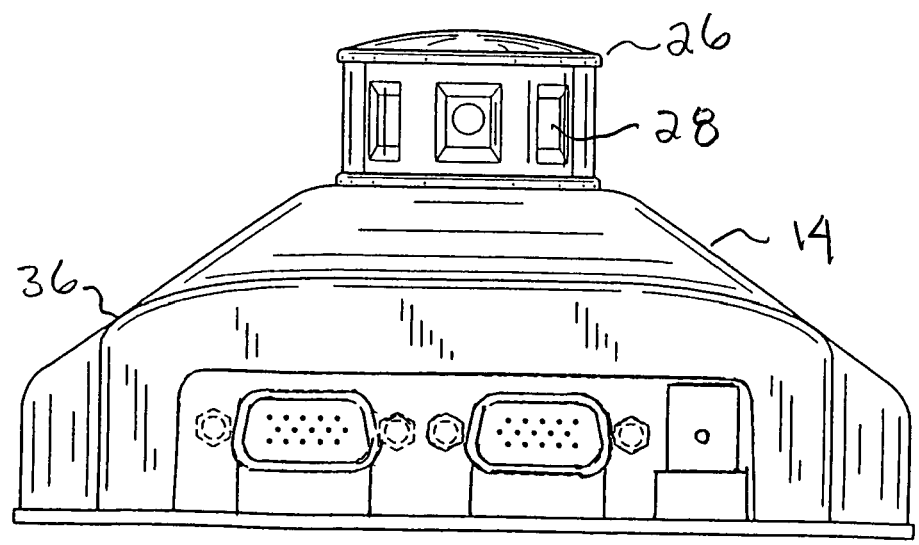
FIG. 2 is a rear view of a receiver for a wireless foot control system in accordance with the invention.

With reference to the drawings wherein like numerals represent like parts throughout the several figures, a wireless foot control system 10 in accordance with the present invention comprises two major subsystems, a transmitter 12 (FIG. 1) that communicates with a receiver 14 (FIG. 2), using a given medium.

Figure 3A:
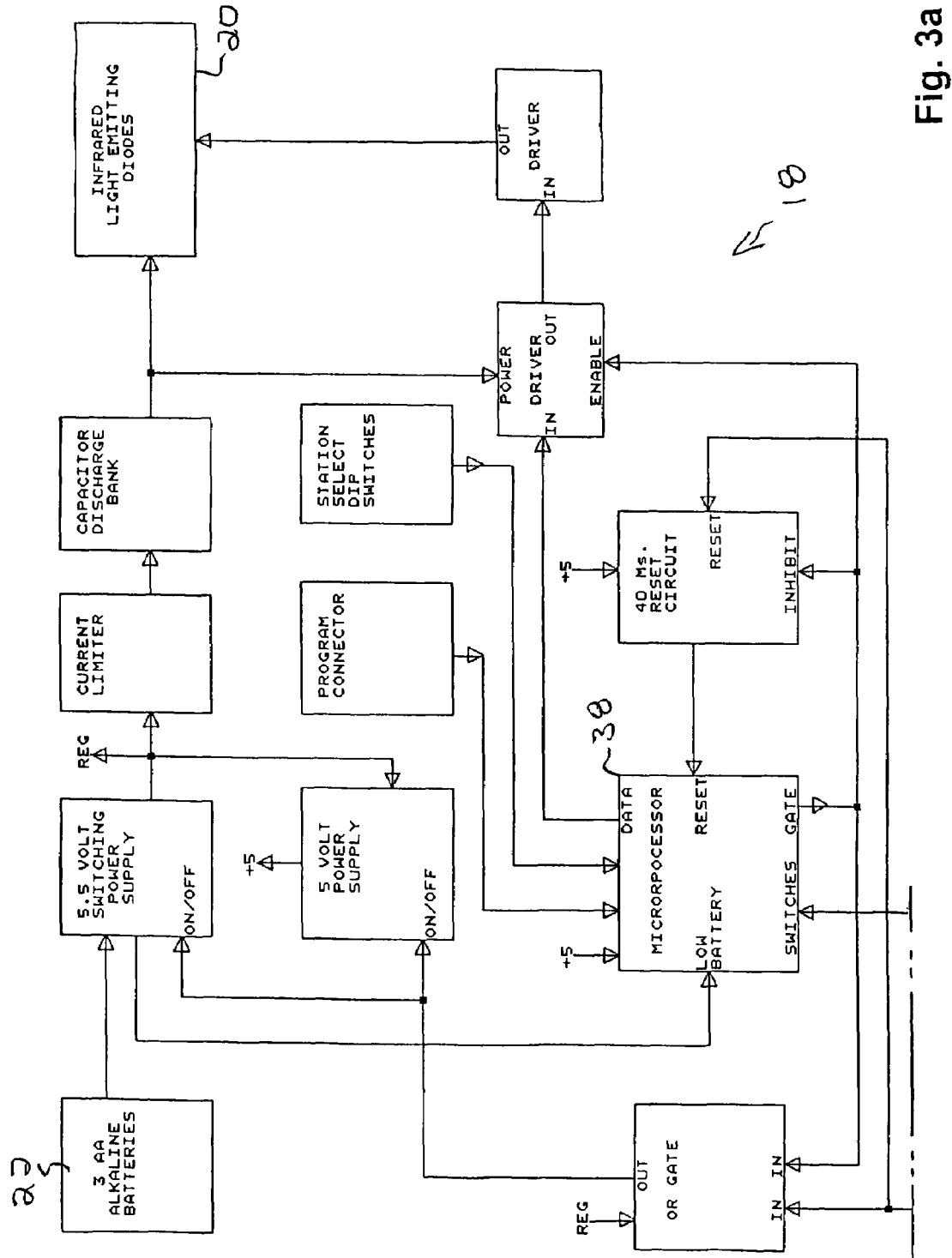
FIGS. 3a and 3b are a schematic block diagram of an infrared transmitter for a wireless foot control system in accordance with the invention.
Figure 3B:
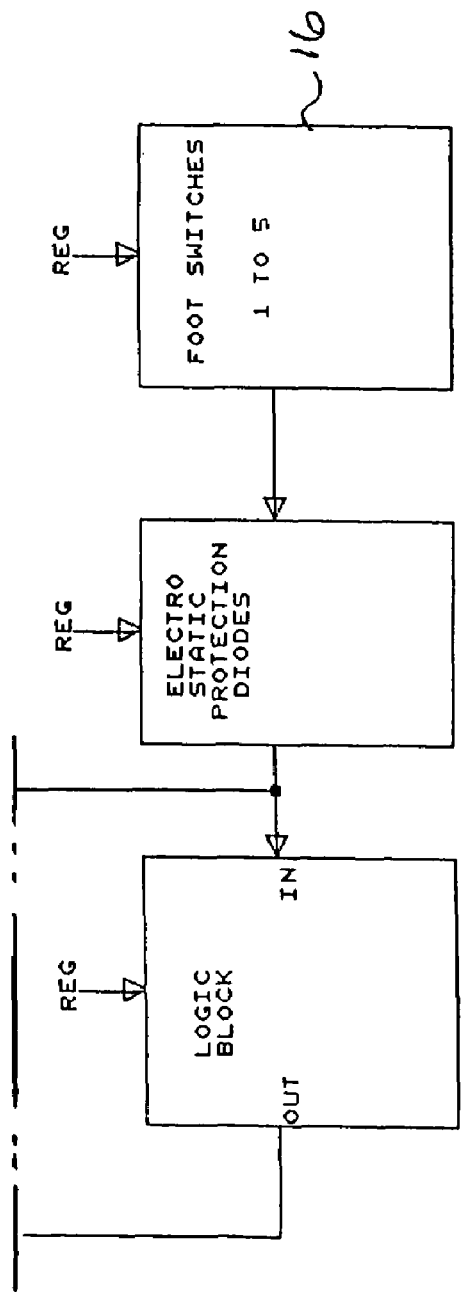

With additional reference to FIGS. 3a and 3b, the transmitter 12 includes at least one foot pedal 16 that functions as a switch mechanism for initiating an electrical control signal. Electronic circuitry 18 is activated by closing the switch mechanism to produce the control signal in a format which can be transmitted and received over the communication medium. A medium generator 20 produces the communication medium. A power source 22 of a pre-selected design, such as a battery, supplies power to the medium generator 20 through a power supply 21 of the electronic circuitry 18. The power supply 21 comprises a capacitor bank 23 which is charged through a current limiter 25 by the power source 22. Approximately 150 milliseconds after charging initiates, the capacitor bank 23 is at or nearly at the same voltage as the output of the switching power supply 19. It should be noted that the current limiter 25 and the controlled rate of rise of the switching power supply 19 limits the peak current required from the batteries 22. It should be further noted that the batteries 22 alone would not be capable of providing the current required by the medium generator 20, this current is provided by the capacitor bank 23. Since the transmission time is short relative to the time between transmissions (approximately 1 percent) and the current of the transmit bursts are controlled, the capacitor bank 23 is recharged at a low current between transmissions. A housing 24 physically contains and protects the internal components of the transmitter 12.

In a preferred embodiment, the medium generator 20 is multiple infrared light-emitting diodes (IRED) arranged on the transmitter housing 24 such that the IR light wave pattern emitted from the transmitter 12 is evenly distributed. Such a uniform distribution of the communication medium provides the greatest flexibility of positioning and orienting the transmitter 12 relative to the receiver 14. It has been experimentally determined that ten (10) IREDs are required to provide a uniform distribution of the emitted communication medium from the transmitter 12.

Figure 4:
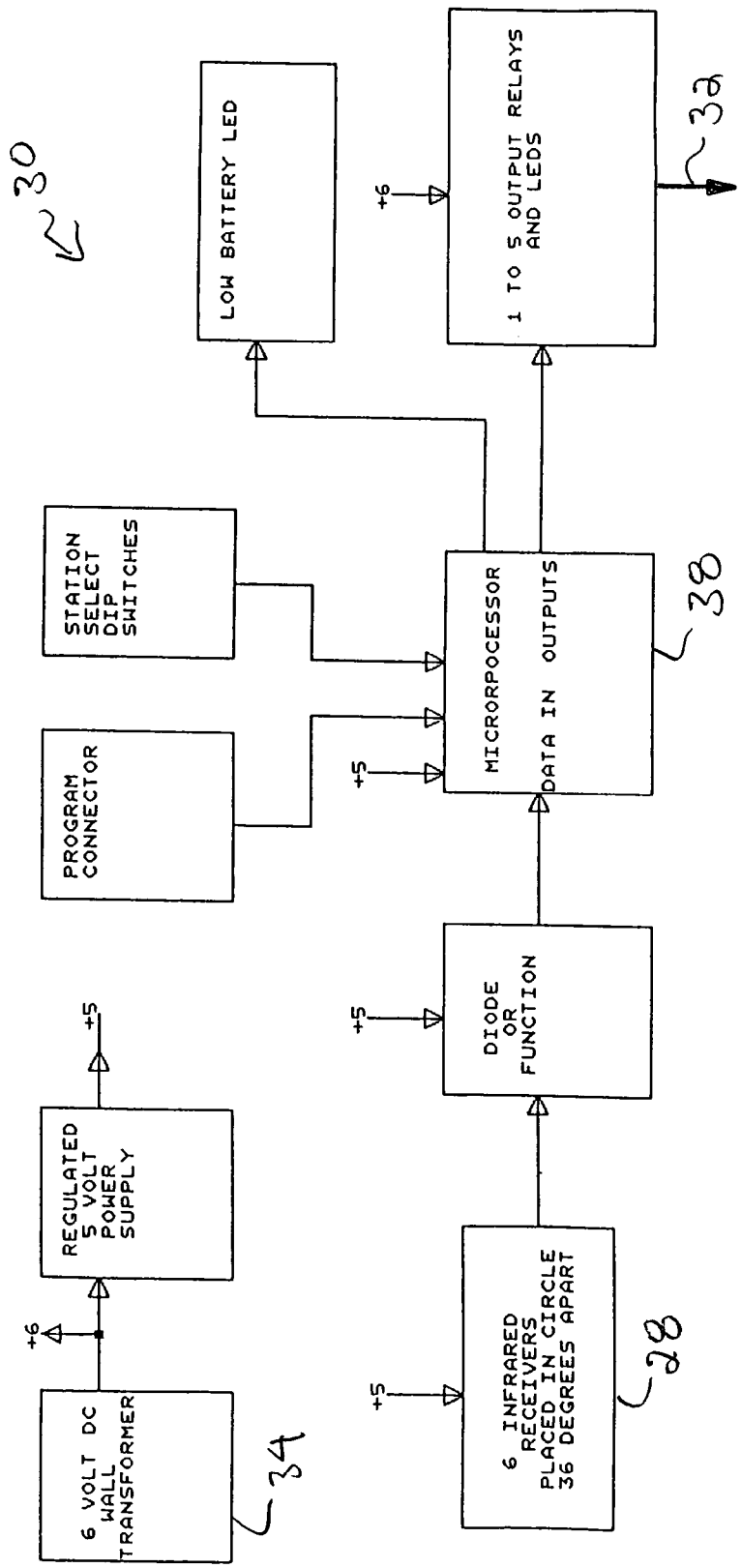
FIG. 4 is a schematic block diagram of an infrared receiver for a wireless foot control system in accordance with the invention.

With additional reference to FIG. 4, the receiver 14 includes a circular dome arrangement 26 of medium collectors 28 for receiving the control signal transmitted by the transmitter 12. Electronic circuitry 30 processes the modulated IR light comprising the control signal into an input electrical control signal 32 for the equipment to be controlled (not shown). A power source 34, such as a battery or a plug-in wall adaptor, energizes the medium collectors 28 and the electronic circuitry 30. A receiver housing 36 physically contains and protects the internal components of the receiver 14.

In the preferred embodiment, the medium collector 28 is multiple photodiodes that are active in the infrared wavelength. It was experimentally determined that six (6) infrared (IR) receivers, arranged in a circular pattern reflector geometry, are sufficient to capture incident (LOS) and reflected (NLOS) IR light waves.

The electronic circuitry 18 of the transmitter 12 and the electronic circuitry 30 of the receiver 14 each include a microcontroller 38, for example a PIC16F628 20 MHz microcontroller, for controlling the operation of the electronic circuitry 18, 30. The foot control system 10 allows up to four transmitters 12 to operate simultaneously in the same IR environment. Each transmitter 12 uses a 'bounded randomized' method that controls packet transmission timing.

Figure 5:
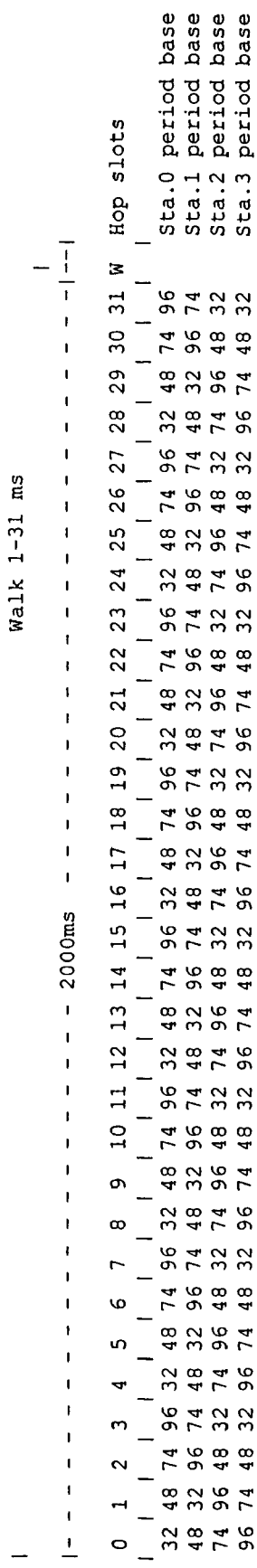
FIG. 5 is an illustration of a repeating transmission cycle with 32 hop slots.
Figure 6:
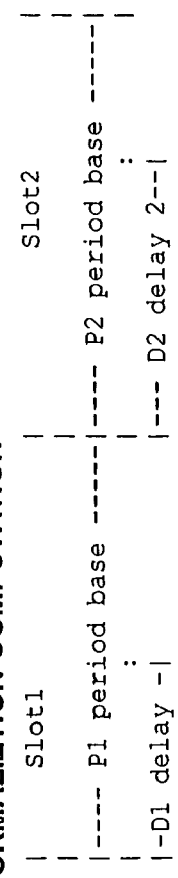
FIG. 6 is an illustration of a normalization computation.

When a transmitter 12 is active (the foot pedal is depressed), it will continuously transmit the foot pedal state to the receiver. The bounded randomized transmission technique minimizes data packet collisions, and more importantly insures that at least one data packet will successfully arrive at the receiver within every 1050 ms period. The bounded randomized method accomplishes this task by breaking a 2000 ms cycle time into 32 'hop slots', FIG. 5. Each hop slot has one data packet transmission and an associated 'period base' that defines an upper and lower boundary of a delay period. The period bases are assigned to the hop slots based on dip switch station assignments 0-3. Each hop slot has a random generated delay that is bounded in the range of the hop slot's assigned period base. The random generator is seeded with a customer code and the assigned station number. The selected delay period is then normalized, FIG. 6. The normalized delay is the sum of the previous hop slot's period base less it's selected delay period plus the current hop slot's selected delay period. This normalization computation forces a constant packet transmission rate. Four repeating period bases are used. The set of four period bases total to 250 ms, therefore every 250 ms four packets are transmitted (e.g., 32+48+74+96=250 ms).

TABLE 1

Period Delay Sequence Code

```
//**********************************************
char pRand(char pBase) // random period
{ do
    { rand.B+=rand.A;
      rand.C+=rand.B;
      Carry=0;
      rand.C=rr(rand.C);
      if (Carry) rand.C|=0x80
      rand.A+=rand.C;
      if (!rand.walkOffset && rand.A<8) rand.walkOffset=rand.A;
    } while (rand.A<EDGE || rand.A>(pBase-EDGE));
    return rand.A;
}// rand
//**********************************************
void generate_period_sequence(void)
{
    char i,j, // general use
      period, // current non-normalized period.
      delta, // 'normalize' the last period to PBASE time increments
      tripCnt,// trip count
      leg,   // period leg; 'delay period' = 'period Leg' X 'trip count'
      pLast, // last period
      pBase;
    uns16 tt, // general use
      delay; // normalize delay used to compute timer ticks and trips
    // seed the random number generator.
    rand.A = stationNo;
    rand.B = company_code>>8;
    rand.C = company_code&0xff;
    rand.walkOffset=0;
    // Pickup last period for 'circular end rectification' of hop freq. set
    j = stationNo*4; // 'j' is station index into pBaseArr
    pBase = pBaseArr[j+ (hops-1)%noOfpBases];
    pLast = pRand(pBase); // save last period
    delta = pBase-pLast; // compute delta of last to 'normalize' first period
    /* Generate a repeating 'hop' sequence/cycle */
    for(i=0; i<=hops; i++)
    { // set timer values
      /* note: this 'i' loop index is base zero, e.g., a 32 element hop sequence
       * uses indexes 0..31 for the repeating periods and index
       * element 32 for startup delay.
       **/
      if (i==hops)
      { // speical delay startup case
        leg = 55; // oScope measured = 5ms.
        tripCnt=1; // trip count
      }
      else
      { // repeating elements (index=0-31)
        /* alternate pBase */
        j = stationNo*4; // 'j' is station index into pBaseArr
        pBase = pBaseArr[j+ i%noOfpBases];
```

TABLE 1-continued

Period Delay Sequence Code

```
        if(i == (hops-1))
        { // apply walk
          period = pLast;
          period += stationNo*8; // add walk 0/8/16/32
          // try to avoid the same walk when 2 stations have same dipSw No.
          if (rand.walkOffset)
            period += rand.walkOffset;
          else period += rand.A&7;
        }
        else
        { // pickup next period using randomizer:
          period = pRand(pBase); // pickup random value
        }
        // compute the 'normalized' period delay
        delay = (uns16)period+delta; //add 'normalizing' delta to the period
        delta = pBase - period; // compute this delta to 'normalize' the next
      period
        /* compute the trip count and period 'leg' value.
         * maxTimeOut: 65536 ticks / 625000 ticks/sec = .1048576 sec =
      104.8576 ms
         **/
        tripCnt=0; // assume not 'realizable'
        while (1)
        { j=1; // minimum trip count based on a maximum 104ms timer.
          tt=delay; while (tt>104){ tt-=104; j++; }
          do
          { leg = delay/j; // divide down
            tt =(uns16)leg*j; // multiply back up.
            if (tt == delay) { tripCnt=j; break; } // test realizable ?
            j++;
          } while (j<12); // loop on possible trips 1-11 for PBASE4
      (randReveal4.c)
          if (tripCnt) break; // test: Is the period 'realizable' ?
          // No, make an adjustment; Note: even periods are generally
      'realizable'.
              delta++;
              delay++;
        }
      }// if-else last 'startup' element
      tt = leg;
      tt *= 625;     // 625 ticks per ms
      tt = 0xffff - tt;  // counter counts up to 0xffff then overflows to
                         0x0000.
      tt++;
      trips[i] = tripCnt; // save trip count
      periods[i] = tt; // save delay per trip
    }//for
}///generate_period_sequence
** End of Document **
```

In an example of computing the delay normalization, slot 0, station 0 has a period base (PBASE) value of 32 ms. Accordingly, a random generated delay is selected between 2 and 30 ms, for example 21 ms. The previous hop slot index number is 31 and has a PBASE value of 96 and has a selected delay of 80 ms. Using the formula delay=P1−D1+D2, the normalized delay marked from the previous packet transmission (of hop slot index 31) is computed to be 96−80+21=37 ms. Therefore, the transmitter will send a data packet after a 37 ms delay.

Assuming that the next hop slot (index no. 1) has a 48 ms PBASE value, a random generated delay is selected between 2 and 46 ms, for example 12 ms. Since the previous hop slot index number is 0 and has a PBASE value of 32, the normalized delay marked from the previous packet transmission (of hop slot 0) is computed to be 32−21+12=23 ms. Therefore, the transmitter will send a data packet after a 23 ms delay.

This timing process is repeated for all 32 hop slots. The last time slot (31) has an additional station dependant 'walk' delay that causes the 2000 ms 30 cycles to continuously roll or walk in time with respect to other transmitter stations. It should be noted that each packet transmission will last approximately 1.6 ms.

TABLE 2

Four Station Receiver Profile
Produced Using Bounded Randomized Method
Run period = 8 days

| Station number | 0 | 1 | 2 | 3 |
|---|---|---|---|---|
| Rcv Packet Count Distribution | 8545356 | 8503588 | 8480179 | 8431378 |
| 0-105 ms | 2826824 | 2704494 | 2781825 | 2743017 |
| 105-210 ms | 4927025 | 5086532 | 4886103 | 4868708 |
| 210-315 ms | 740343 | 663086 | 761927 | 766751 |
| 315-420 ms | 47263 | 45551 | 46292 | 48953 |
| 420-525 ms | 3594 | 3645 | 3709 | 3565 |
| 525-630 ms | 275 | 264 | 296 | 349 |
| 630-735 ms | 31 | 14 | 25 | 33 |
| 735-840 ms | 1 | 1 | 2 | 2 |
| 840-945 ms | 0 | 1 | 0 | 0 |
| 945-1050 ms | 0 | 0 | 0 | 0 |

The profile shown in Table 2 illustrates how many packets arrive relative to the start of the failsafe timeout. The failsafe timeout is reset on the arrival of each valid data packet. It should be noted that all of the packets arrived inside of 945 ms and that very few packets (only seven) arrived after 735 ms. This distribution substantiates the determination of the failsafe timeout value that is set to 1050 ms.

An original equipment manufacturer (OEM) customer code is implemented into the software of the IR switch system 10. This OEM code will only allow communication of systems that have been programmed with the same OEM code. Accordingly, systems from different vendors will not communicate with each other and only systems originating from the same OEM vendor can communicate. Both the receiver 14 and transmitter 12 are programmed with matching OEM codes.

The OEM code implementation utilizes a 16 bit CRC to relay the code from the transmitter 12 to the receiver 14. The transmitter hashes the OEM code into the CRC value that is transmitted with each 32 bit data packet. The receiver 14 then calculates a CRC value on the data packet payload and the pre-programmed OEM code. If the calculated CRC matches the received CRC then the received data packet is valid and originated from an OEM matched transmitter 12.

The bounded randomized transmission method naturally generates collisions of data packets sent by multiple transmitters. Therefore, it is necessary that the system also be able to detect these collisions in order for it to function correctly.

The receiver 14 uses an edge detection method to decode inbound data packets. Bit patterns are determined by elapsed time between 'high' going active edges. Errors can be detected at both the data packet 'frame' level and at the 'data' level. Most of the data framing collision errors are trapped by determining that an active 'high' state persists for more than approximately two thirds (38 μs) a bit period (50.8 μs). This can be determined because each high bit has a 'low' state 'gap' that trails it's active envelope. The transmitter bit timing is depicted in the following diagram:

TABLE 3

```
|<------------------ 50.8 μs = 254 CPU cycles ---------------------->|
|<----- 24.2 μs BURST ----->|<---------- 26.6 μs GAP ------------>|
|<----- 121 cycles ------------>|<-------------- 133 cycles ---------->|
```

As shown above, an active burst of 24.2/μs by the transmitter will result in an active envelope of 32 μs to 36 μs at the receiver. In the case of a collision, the receiver would see an active envelop that is longer than 38 μs, and will interpret this event as a data collision.

Another key collision detection method is the detection of trailing packet collisions. Each packet has a trailing guard period of approximately 10 bit periods or the longest "zero state bit span" possible in a data packet. The next successive packet in not allowed to directly trail the current packet being received. Collisions are detected when another high state is detected trailing a packet.

Error detection is also accomplished be examining a full data frame for validity. The diagram below shows the 32 bit frame of data that the receiver receives. Some of the data validity checks are as follows:

Calculate a CCITT 16 bit CRC. Note that this CRC also includes hard coded station dependant constants.

Two collision tests bit couplets, these couplets must read '10' and '01'

The station ID is coded as one of four bits. Each of the 4 possible stations has it's own bit. Exactly one of these four bits should be active; no more and no less.

The last validity check tests if the pedal combinations are valid. This IR switch imposes a constraint on the possible pedal states. This constraint is used as a final data validation before the outputs are latched.

Pedal state Test 1: Error if pedal switch 2 is active and not pedal switch 1.

Pedal state Test 2: Error if pedal switch 4 is active and not pedal switch 3.

TABLE 4

32 BIT DATA FRAME

| [3] \|7654 3210\| | [2] \|7654 3210\| | [1] \|7654 3210\| | [0] \|7654 3210\| | |
|---|---|---|---|---|
| x | | | | Stop Bit |
| xxx xxxx | x | | | CRC-16-high, 8 bits |
| | xx | | | Collision test, 2 bits = 10 |
| | x xxxx | xxx | | CRC-16-low, 8 bits |
| | | x x | | Collision test, 2 bits = 01 also used as breaking bit |
| | | xxx | xx | Pedals states, 5 bits |
| | | | x | Battery state, 1 bit |
| | | | x xxx | Station ID, 4 bits, also used for collision test. |
| | | | x | Start bit |

When any foot pedal 16 is depressed, the transmitter 12 will continuously send data packets containing the pedal states to the receiver 14. If the receiver 14 does not receive a data packet in 1050 ms, then it will 'timeout' and turn all of its outputs off. This 'failsafe' method is the reason that the transmitter sends data continuously and insures that no pedal switch relays are active on a receiver unless a constant communications link is sustained.

Figure 7:
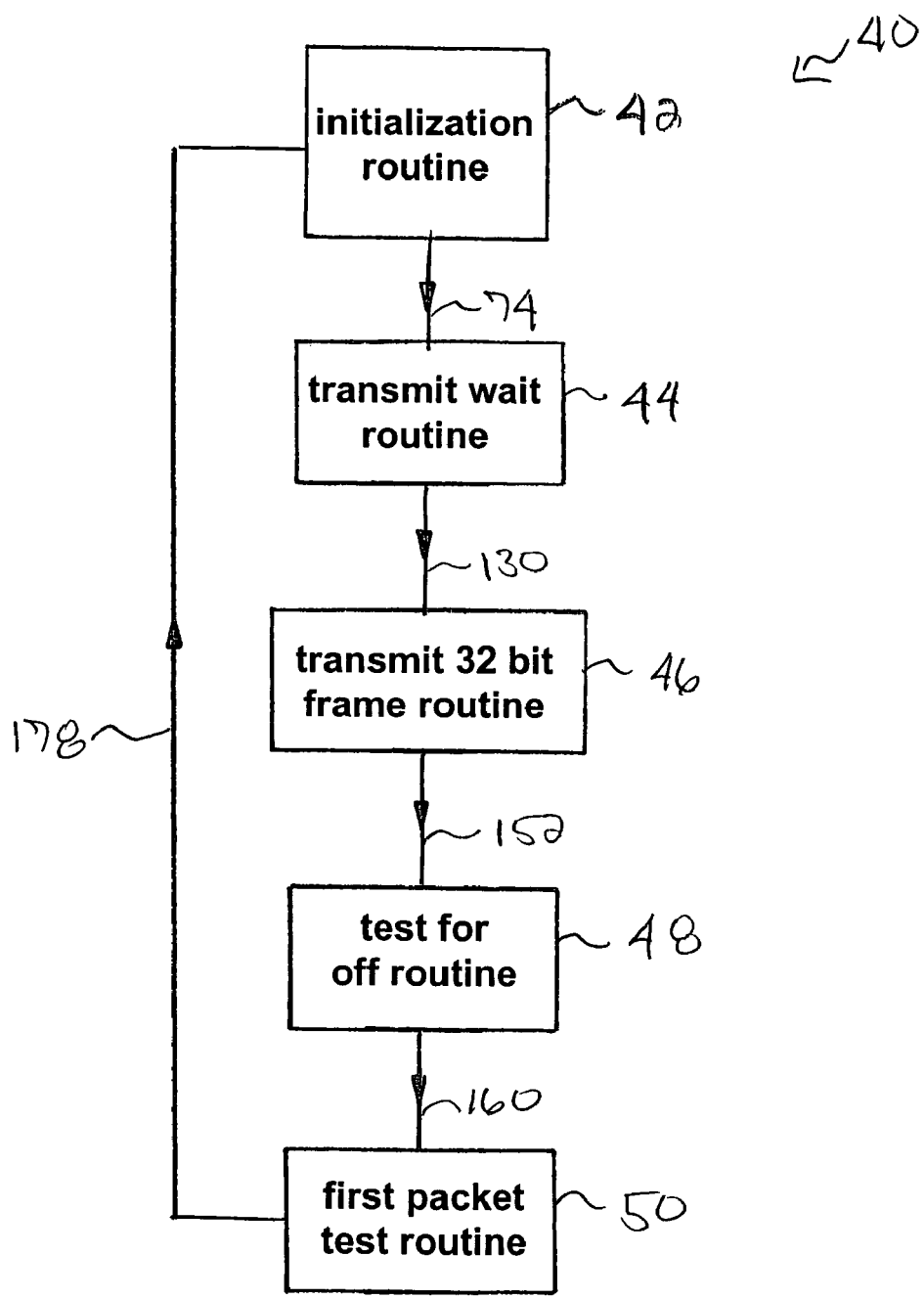
FIG. 7 is a flow diagram of the transmitter operating system software.

With reference to FIG. 7 the transmitter operating system software 40 includes an initialization routine 42, for resetting the transmitter 12 when it is initially energized, a transmit wait routine 44 for maintaining the transmitter 12 in a wait state until a change in the pedal state is detected, a transmit 32 bit frame routine 46 for transmitting a control signal when the transmit wait routine 44 detects a change in the pedal state, and test for off and first packet test routines 48, 50 for returning the transmitter 12 to the wait state on completion of transmission of the control signal.

Figure 8:
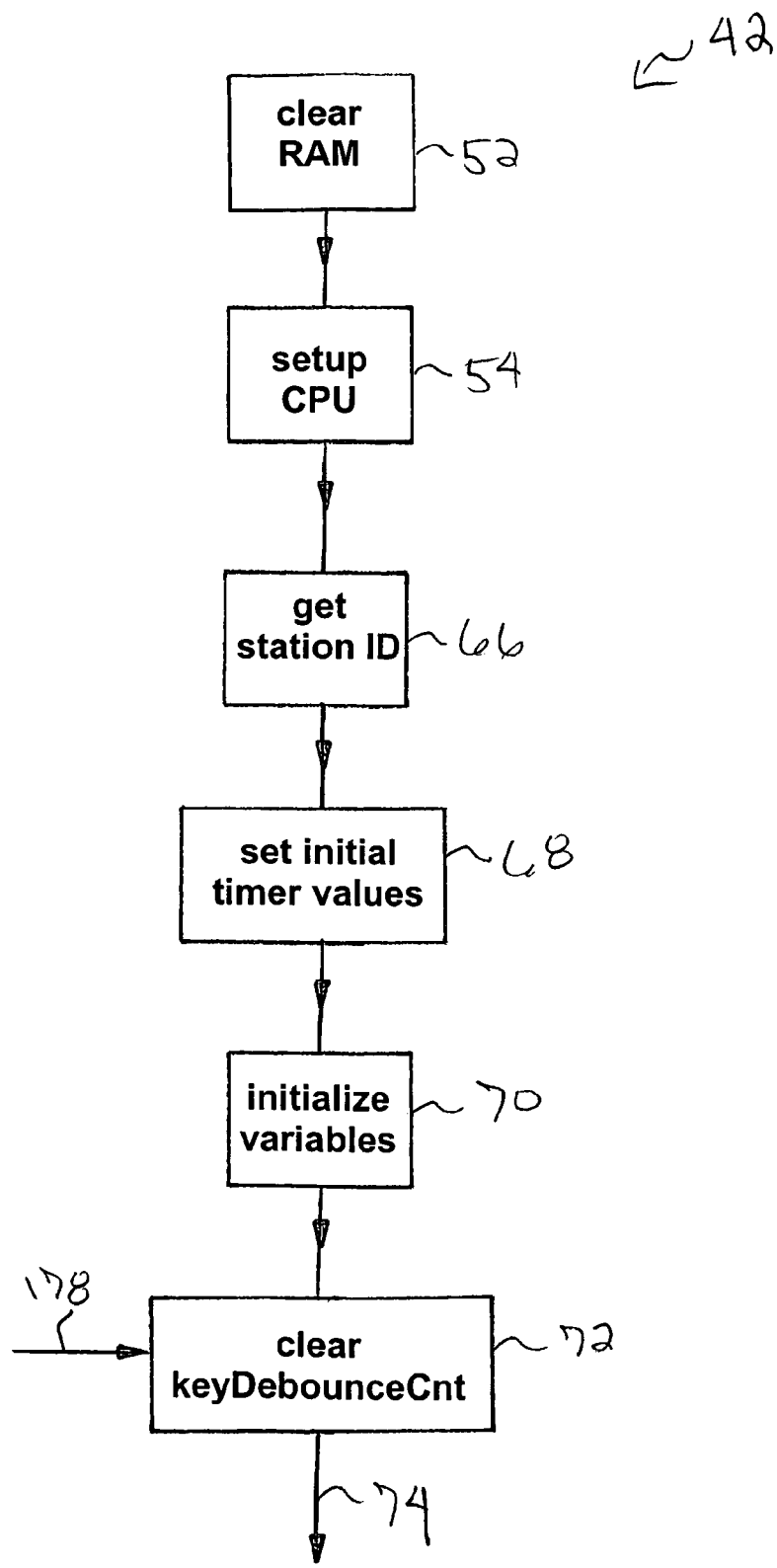
FIG. 8 is a flow diagram of the transmitter operating system initialization routine.
Figure 9:
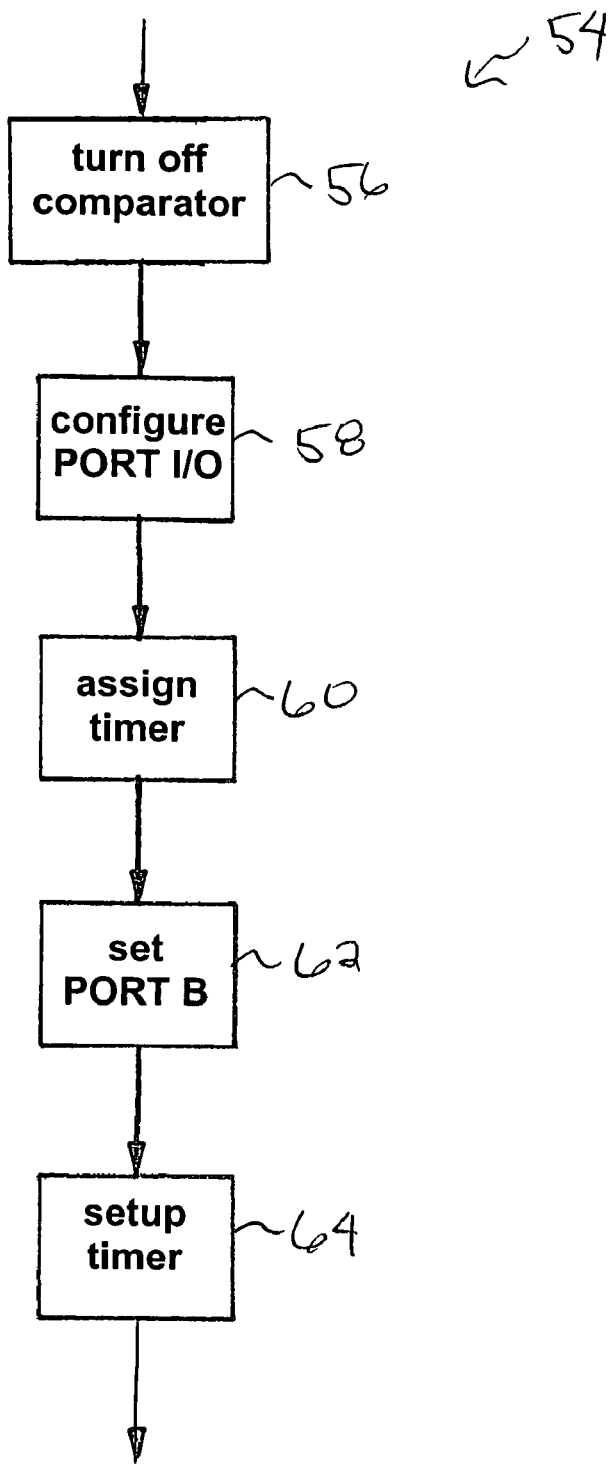
FIG. 9 is a flow diagram of the initialization routine CPU setup subroutine.

With reference to FIG. 8, the initialization routine 42 starts by clearing 52 the random access memory (RAM) of the micro-controller 38. Next, the micro-controller CPU is setup 54. This requires turning off 56 the comparators; configuring 58 the PORT I/O; assigning 60 the timer to watchdog, setting WDT prescale to 1:16 (to timeout at 18 ms×16=288 ms); and setting 62 the PORTB weak pull-ups. The timer 1 frequency is set 64 to 625,000 Hz and to interrupt on overflow. This is used to transmit the pedal state on fixed periods, where the 16 bit counter overflows from count 65535 to 0 (zero), to yield 0.625 timer ticks per ms. Next, the station ID is updated 66 from the dipswitch setting and the transmission "periods" are set in terms of timer No. 1 ticks and trip counts for periods that require more than one timer No. 1 timeout. The LED drive capacitors require a 100 ms delay from the "power good" state for charging. An external RC reset circuit tied to the pedal OR gate provides a 38 ms delay from "power good". Accordingly in the next step, the initial timer values are set 68 to delay 60 ms to provide the remainder of the capacitor charging time. The PIC CPU PWRTE (Power Timer Enabled) is also disabled in this step. Next, the system variables are initialized 70, including "power off packet transmit counter", "current pedal state, "last pedal state" and "first packet flag=1". Finally, the variable "keyDebounceCnt" (used to de-bounce all pedal state changes at 8 ms) is cleared 72 and the micro-controller exits 74 the initialization routine 42 and enters the transmit wait routine 44.

Figure 10:
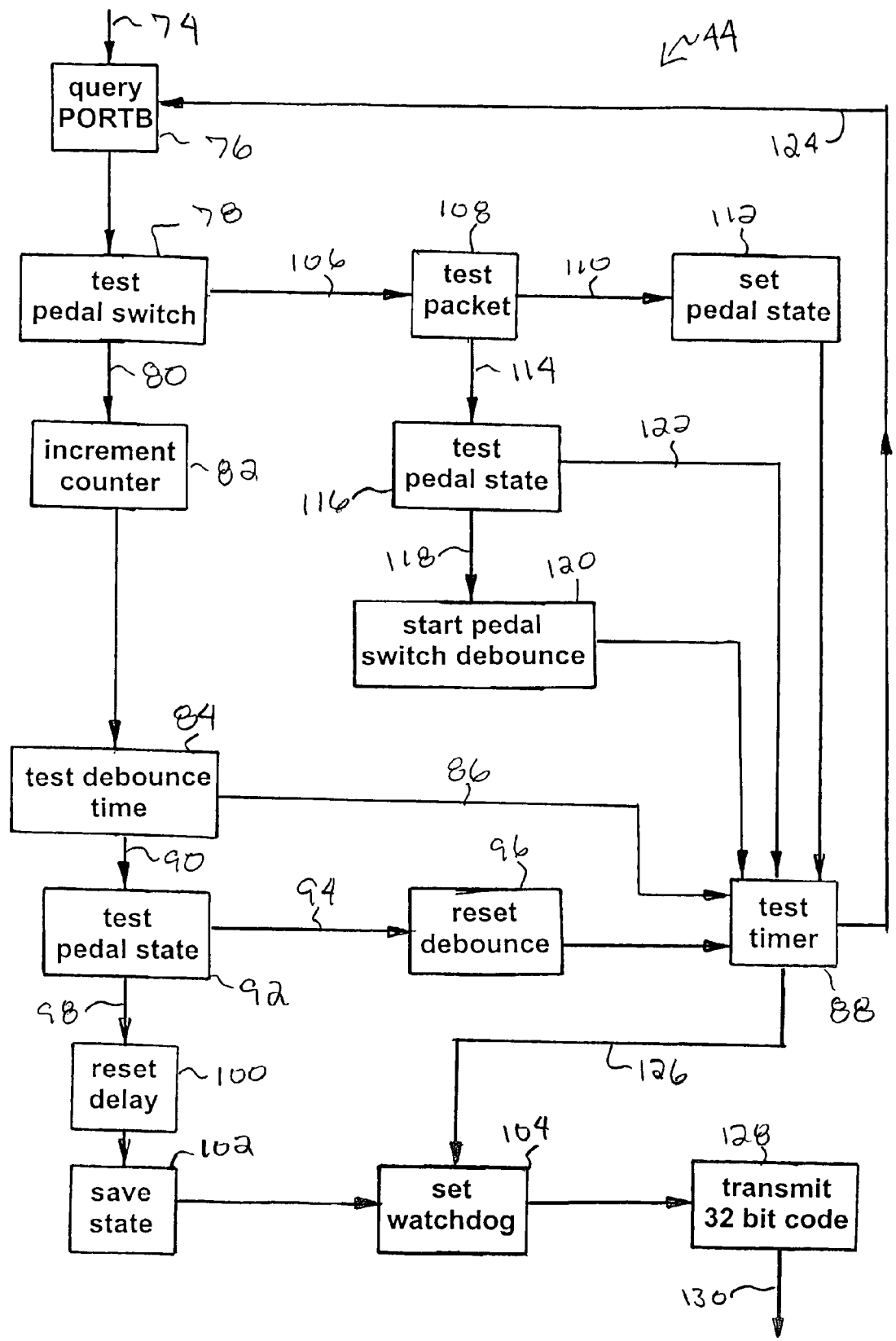
FIG. 10 is a flow diagram of the transmitter operating system transmit wait routine.

With reference to FIG. 10, the transmit wait routine 44 initially queries 76 PORTB for the current pedal state and tests 78 whether the pedal switch debouncing has started (keyDebounceCnt>0). If the pedal switch debouncing has started 80, the debounce delay time counter is incremented 82 and the micro-controller tests 84 whether the debounce time has been met (keyDebounceCnt=2000 yields 8 ms). If the debounce time has not been met 86, the micro-controller tests 88 whether the transmit timer has expired. If the debounce time has been met 90, the micro-controller tests 92 whether the pedal state has changed (current_pedal_state!=last_pedal_state). If the pedal state has not changed 94, the micro-controller resets 96 the debounce (keyDebounceCnt=0) and then tests 88 whether the transmit timer has expired. If the pedal state has changed 98, the transmit timer value is reset 100 to delay 60 ms, the last state for "state change detector" is saved 102, and the micro-controller sets 104 the watchdog for 18 ms×16=288 ms release. If the pedal switch debouncing has not started 106, the micro-controller tests 108 whether a packet has been sent since the power-up (firstPacketFlag). If a packet has not been sent 110 since the power-up, the micro-controller sets 112 the pedal state that is to be transmitted (last_pedal_state=current_pedal_state) and then tests 88 whether the transmit timer has expired. If a packet has been sent 114 since the power-up, the micro-controller tests 116 for whether the pedal state has changed (last_pedal_state!=current_pedal_state). If the pedal state has changed 118, the micro-controller starts pedal state debouncing 120 (keyDebounceCnt=1) and then tests 88 whether the transmit timer has expired. If the pedal state has not changed 122, the micro-controller tests 88 whether the transmit timer has expired. If the transmit timer has not expired 124, the micro-controller again queries 76 PORTB for the current pedal state. If the transmit timer has expired 126, the micro-controller sets 104 the watchdog. After the watchdog is set 104, the micro-controller transmits 128 the 32 bit frame code shown in Table 4, setting the number of bits to transmit per frame, including the start and stop bits (bitCount=32), and exits 130 the transmit wait routine 44.

Figure 11:
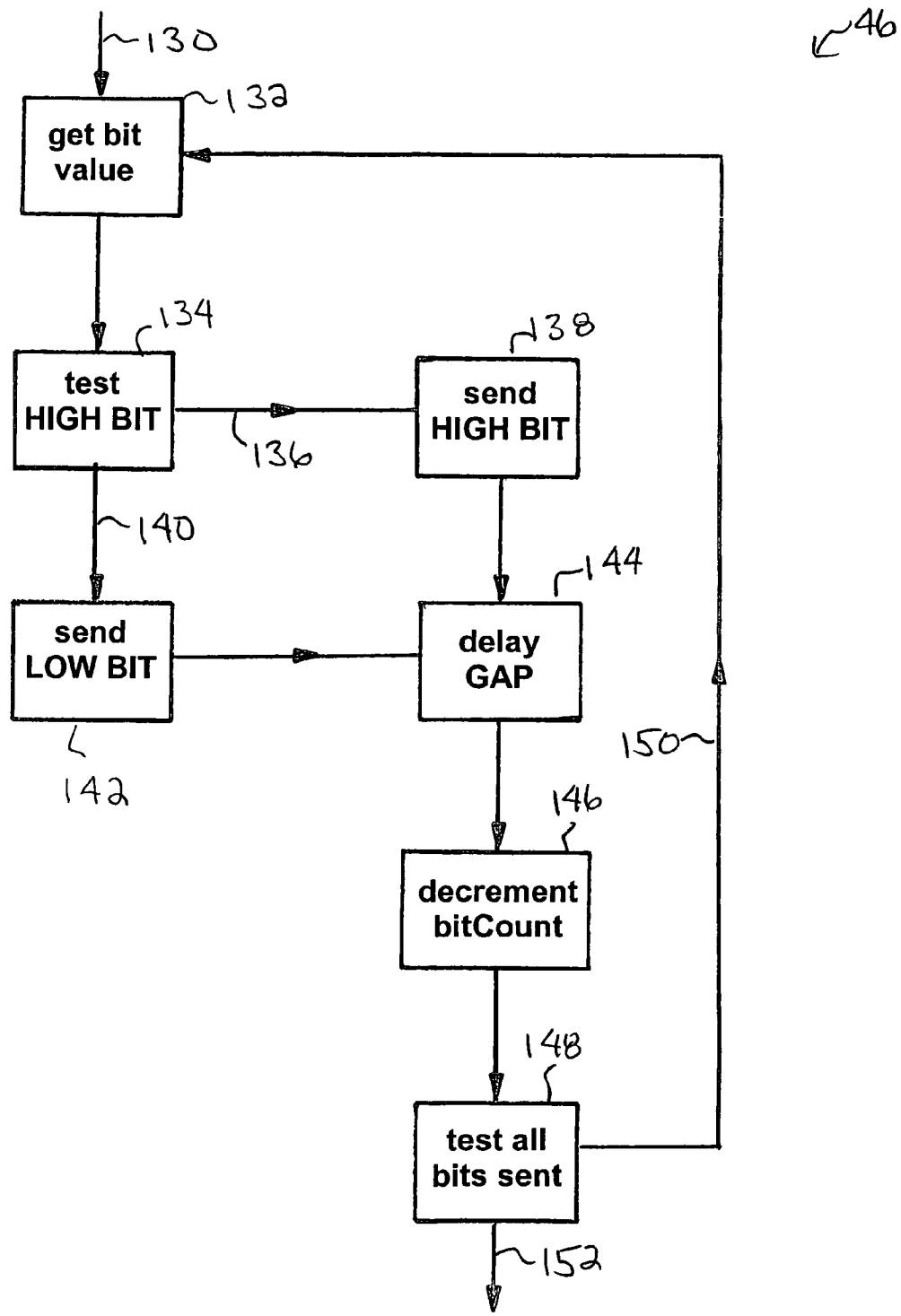
FIG. 11 is a flow diagram of the transmitter operating system transmit 32 bit frame routine.

With reference to FIG. 11, the transmit 32 bit frame routine 46 initially obtains 132 the bit value by rolling the frame bit pattern into the carry flag and then queries 134 whether the bit value is high. If the bit value is high 136, the micro-controller sends 138 a HIGH bit to the IR LEDs. More specifically, the micro-controller sends a pulse train to the IR LEDs, where each pulse is five (5) cycles high and six (6) cycles low (11 pulses per burst times 11 CPU cycles per pulse equals 121 CPU cycle per burst, or pulse train). If the bit value is not high 140, the micro-controller sends 142 a LOW bit by delaying 121 CPU cycles low (24.2 µs). In either case, the micro-controller then delays 144 the GAP period of 133 CPU cycles (26.6 µs), decrements 146 bitCount and then queries 148 whether all bits have been sent (bitCount=0). If all of the bits have not been sent 150, the micro-controller loops back to the beginning of the transmit 32 bit frame routine and obtains 132 the bit value. If all of the bits have been sent, the micro-controller exits 152 the transmit 32 bit frame routine 46 and initiates the test for off routine 48.

Figure 12:
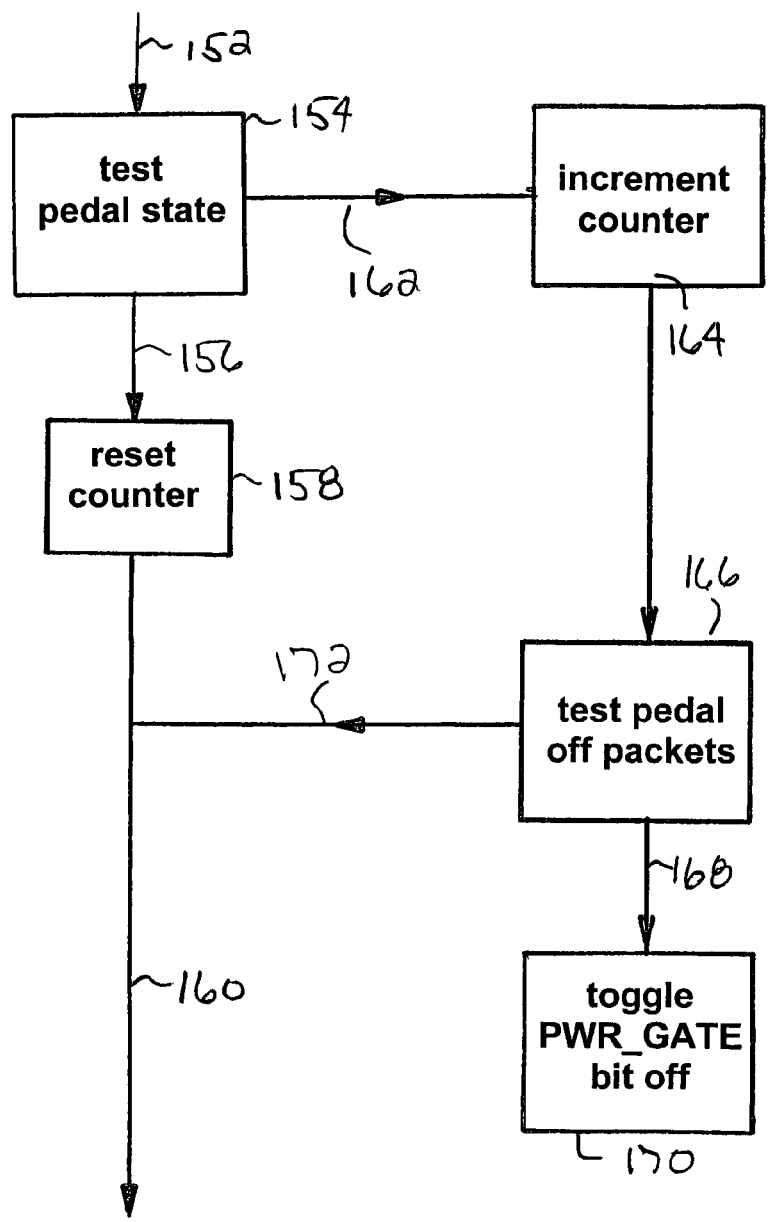
FIG. 12 is a flow diagram of the transmitter operating system test for off routine.

With reference to FIG. 12, the test for off routine 48 first queries 154 whether all pedals of the transmitter are off. If at least one pedal is still on 156, the micro-controller resets 158 the power off packet transmit counter and exits 160 the test for off routine 48 and initiates the first packet test routine 50. If no pedals are on 162, the micro-controller increments 164 the power off packet transmit counter and then queries 166 whether eighteen (18) pedal off packets have been transmitted. If eighteen pedal off packets have been transmitted 168, the micro-controller turns off 170 the PWER_GATE bit, thereby putting the transmitter in standby. If eighteen pedal off packets have not been transmitted 172, the micro-controller exits 160 the test for off routine 48 and initiates the first packet test routine 50.

Figure 13:
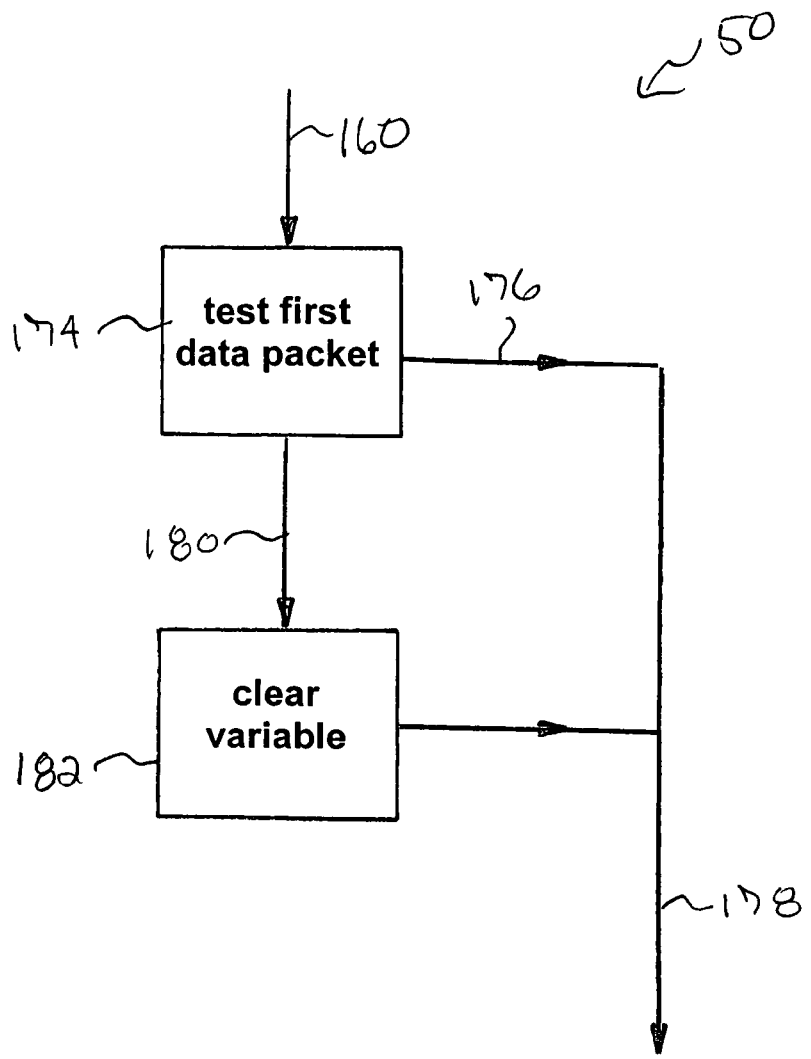
FIG. 13 is a flow diagram of the transmitter operating system first packet test routine.

With reference to FIG. 13, the first packet test routine 50 first queries 174 whether the first data packet has been transmitted. If the first data packet has not been transmitted 176, the micro-controller exits 178 the first packet test routine 50, clears 72 the variable "keyDebounceCnt" and enters 74 the transmit wait routine 44. If the first data packet has been transmitted 180, the micro-controller clears 182 variable "firstPacketFlag", exits 178 the first packet test routine 50, clears 72 the variable "keyDebounceCnt" and enters 74 the transmit wait routine 44.

Figure 14:
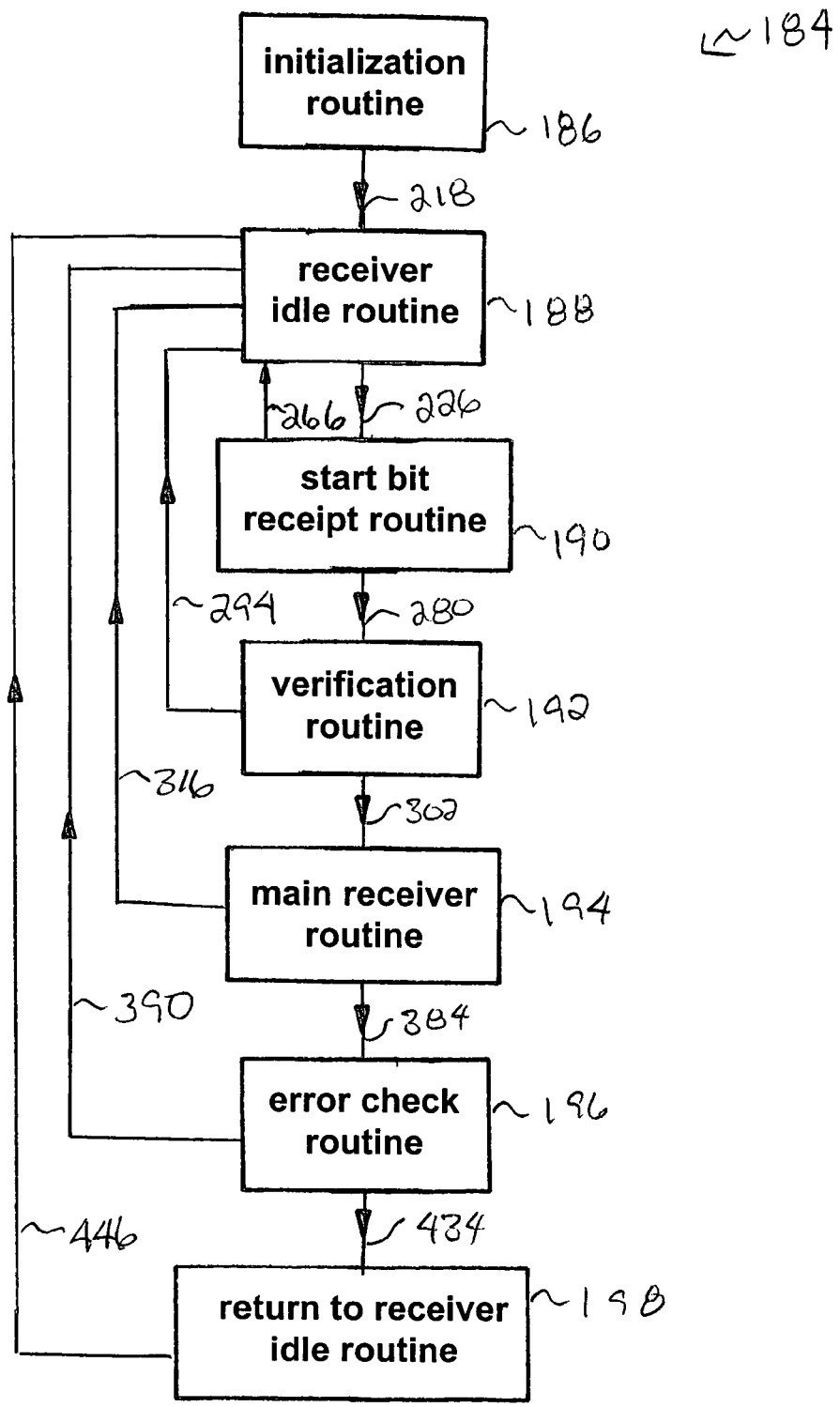
FIG. 14 is a flow diagram of the receiver operating system software.

With reference to FIG. 14, the receiver operating system software 184 includes an initialization routine 186, for resetting the transmitter when it is initially energized, a receiver idle routine 188 for maintaining the receiver in a wait state until a "start bit" (low to high transition) is received, start bit receipt and verification routines 190, 192, a main receiver routine 194, an error check routine 196, and a return to receiver idle routine 198.

Figure 15:
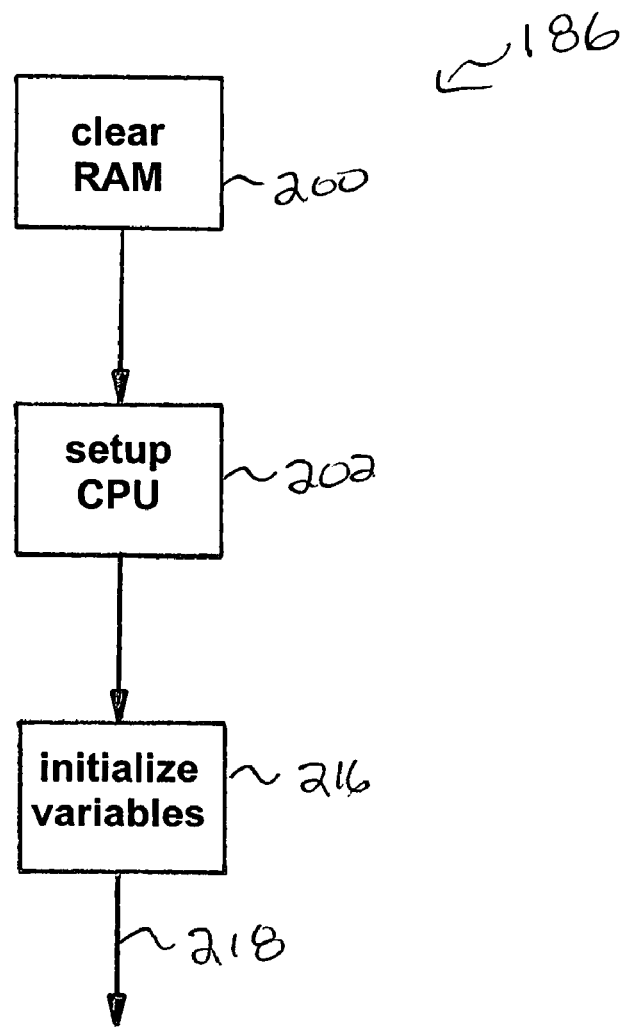
FIG. 15 is a flow diagram of the receiver operating system initialization routine.
Figure 16:
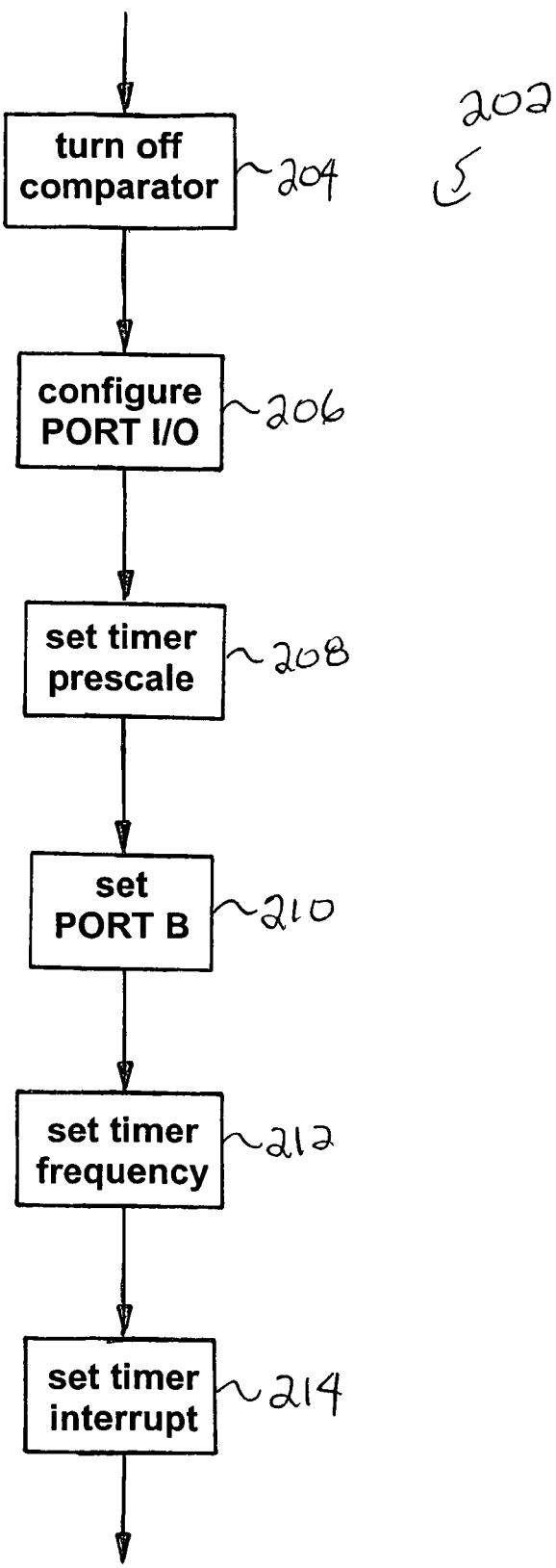
FIG. 16 is a flow diagram of the initialization routine CPU setup subroutine.

With reference to FIG. 15, the initialization routine 186 starts by clearing 200 the random access memory (RAM) of the micro-controller. Next, the micro-controller CPU is setup 202. This requires turning off 204 the comparators (FIG. 16), configuring 206 the PORT I/O, setting 208 timer #0 prescaler to 32 to yield a 156,250 Hz clock (the 8 bit timer is free running and is only read), and setting 210 the PORTB weak pull-ups. The timer 1 frequency is set 212 to 625,000 Hz and to interrupt on overflow. This is used to disable all foot pedal switches if no data is received to control them, thereby providing a "failsafe" release. The time out value is 625 ms. Then timer #1 interrupt is setup 214. Next, the system variables are initialized 216, including initializing the failsafe timer control variables for a dual station/channel receiver. Then the micro-controller exits 218 the initialization routine 186 and initiates the receiver idle routine 188.

Figure 17:
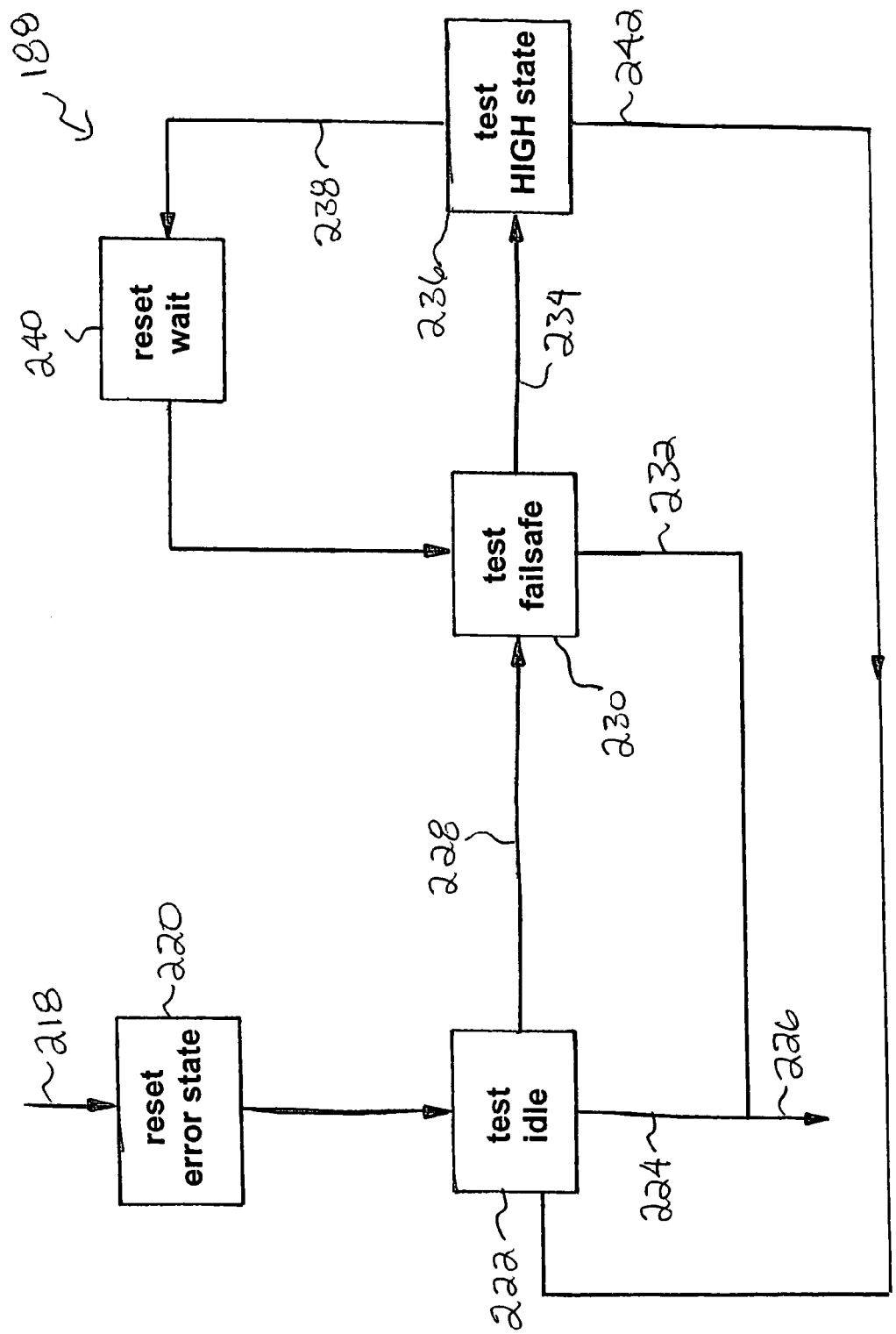
FIG. 17 is a flow diagram of the receiver operating system receiver idle routine.

With reference to FIG. 17, the receiver idle routine 188 starts by the micro-controller resetting 220 the error state (err=0) and testing 222 for steady state idle. For steady state idle, a "low state" must steady or maintained during the idle start period of 500 µs (one "zero state span" period). If the steady idle period has been achieved 224, the micro-controller exits 226 the receiver idle routine 188 and initiates the start bit receipt routine 190. If the steady idle period has not been achieved 228, the micro-controller queries 230 whether failsafe processing is required. If failsafe processing is required 232, the micro-controller exits 226 the receiver idle routine 188 and initiates the start bit receipt routine 190. If failsafe processing is not required 234, the micro-controller queries 236 whether a "high state" has been encountered during the idle start period. If a high state has been encountered 238 during the idle start period, the micro-controller resets 240 the idle wait period and queries 230 whether failsafe processing is required. If a high state has not been encountered 242 during the idle start period, the micro-controller tests 222 for steady state idle.

Figure 18:
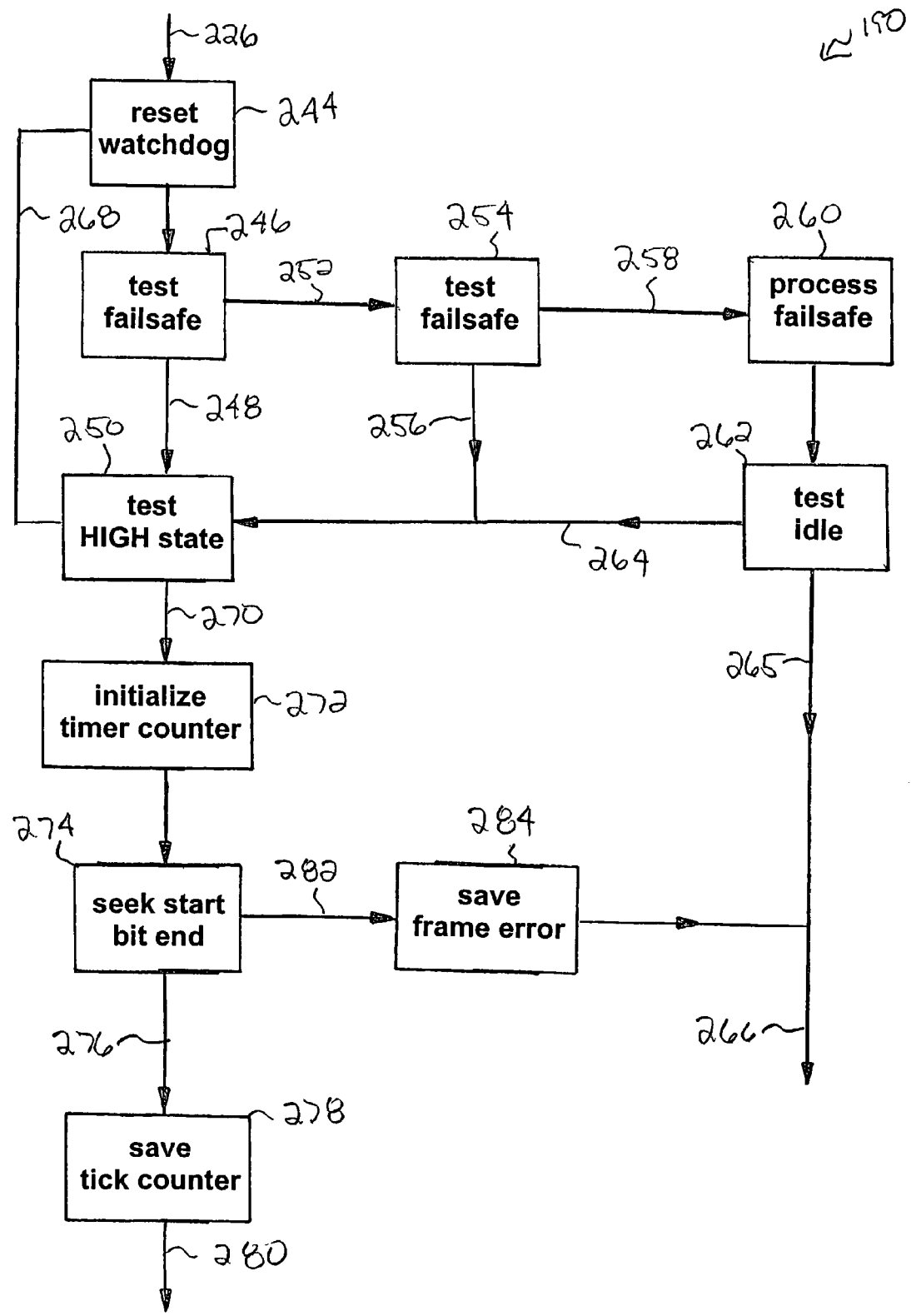
FIG. 18 is a flow diagram of the receiver operating system start bit receipt routine.

With reference to FIG. 18, the start bit receipt routine 190 starts by the micro-controller resetting 244 the "watchdog" and then querying 246 whether the failsafe timeout is at 105 ms (IRQ driven). If the failsafe timeout is not at 105 ms 248, the micro-controller queries 250 whether a high state has been encountered. If the failsafe timeout is at 105 ms 252, the micro-controller then queries 254 whether the failsafe timeout is at 1050 ms. If the failsafe timeout is not at 1050 ms 256, the micro-controller queries 250 whether a high state has been encountered. If the failsafe timeout is at 1050 ms 258, the micro-controller processes 260 the failsafe timeout. To process the failsafe timeout, the micro-controller clears the pedal output latch, resets the tick counter to equal the variable "last_rcv_time" value, and clears the low output latch. After processing the failsafe timeout, the micro-controller queries 262 whether the idle period has been met. If the idle period has been met 264, the micro-controller queries 250 whether a high state has been encountered. If the idle period has not been met 265, the micro-controller exits 266 the start bit receipt routine 190 and restarts the receiver idle routine 188. If a high state has not been encountered 268, the micro-controller loops back to the beginning of the start bit receipt routine 190 and resets 244 the watchdog. If a high state has been encountered 270, the micro-controller initializes 272 the timer count at the "start bit" leading edge, and seeks 274 the end of the start bit (a high to low transition) by querying whether a low state has been encountered within the time period (TICS_PER_ENVELOOPE+1−tickReduction). If the end of the start bit has been encountered 276, the micro-controller saves 278 the timer tick count when the low state was detected (variable "cur_t"), exits 280 the start bit receipt routine 190, and initializes the start bit verification routine 192. If the end of the start bit has not been encountered 282, the micro-controller saves 284 "0" to Frame error, exits 266 the start bit receipt routine 190 and returns to the receiver idle routine 188.

Figure 19:
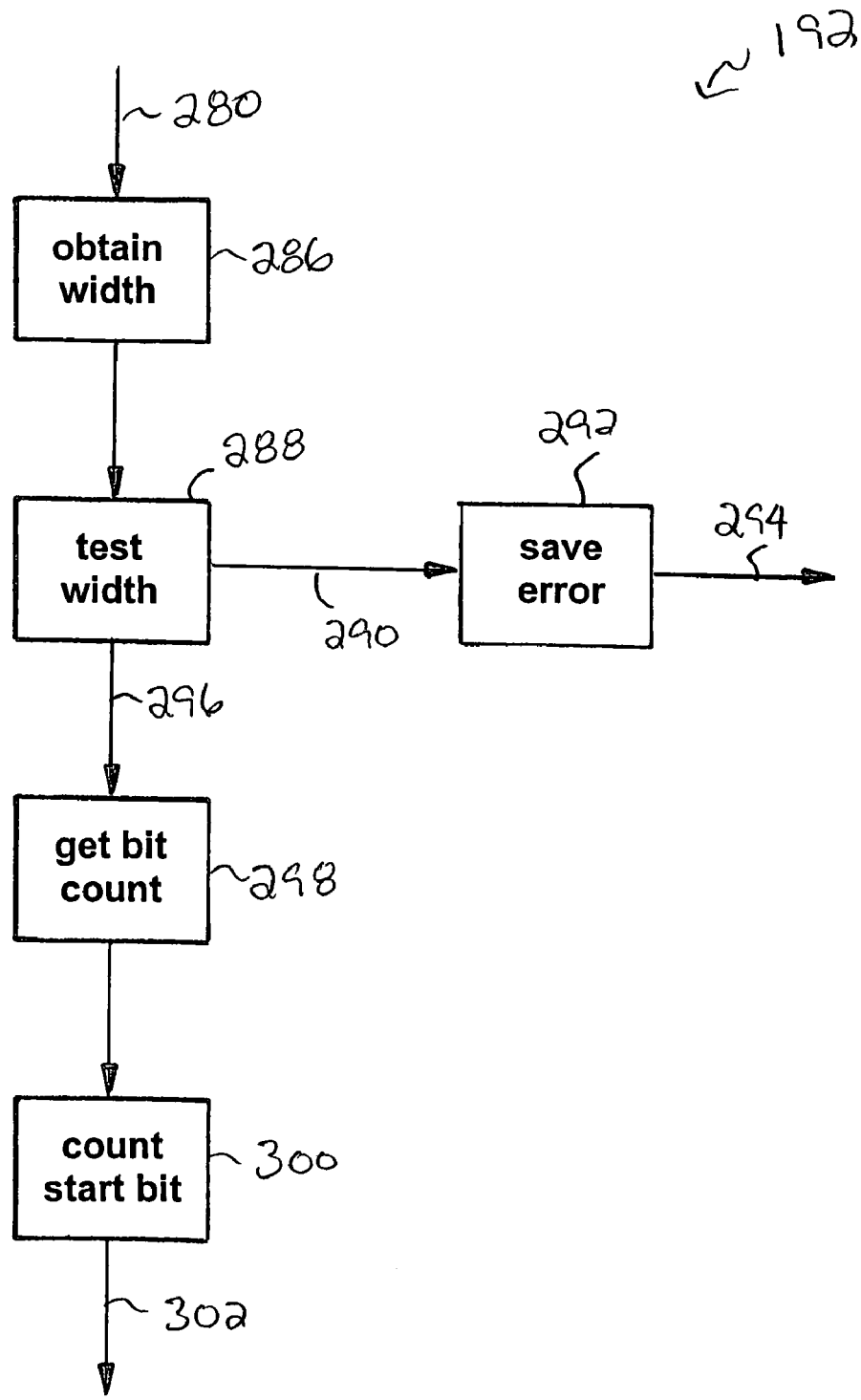
FIG. 19 is a flow diagram of the receiver operating system verification routine.

With reference to FIG. 19, the start bit verification routine 192 determines whether the start bit is a glitch or an IR spike. To do this, the micro-controller obtaining 286 the period of the width of the start bit when the start bit verification routine is initialized and then determines 288 whether the start bit width is too short (lap_t, 2). If the start bit width is too short 290, the micro-controller saves 292 "1" to IR Glitch Error, exits 294 the start bit verification routine 192 and returns to the receiver idle routine 188. If the start bit width is not too short 296, the micro-controller sets 298 the received bit count to 1, counts 300 the start bit in the frame bit counter, exits 302 the start bit verification routine, and initiates the main receiver routine 194.

Figure 20A:
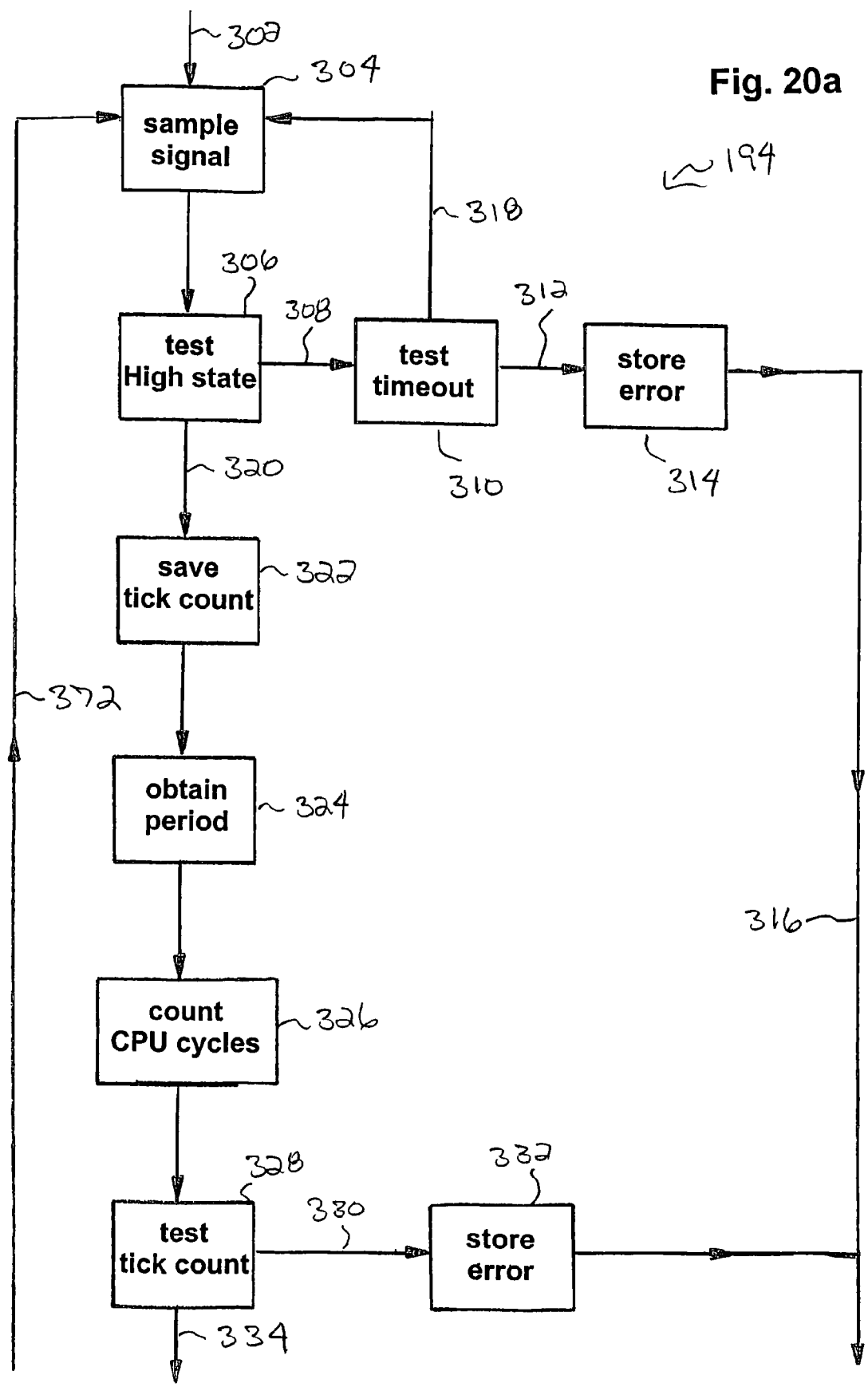
FIGS. 20a, 20b and 20c are a flow diagram of the receiver operating system main receiver routine.
Figure 20B:
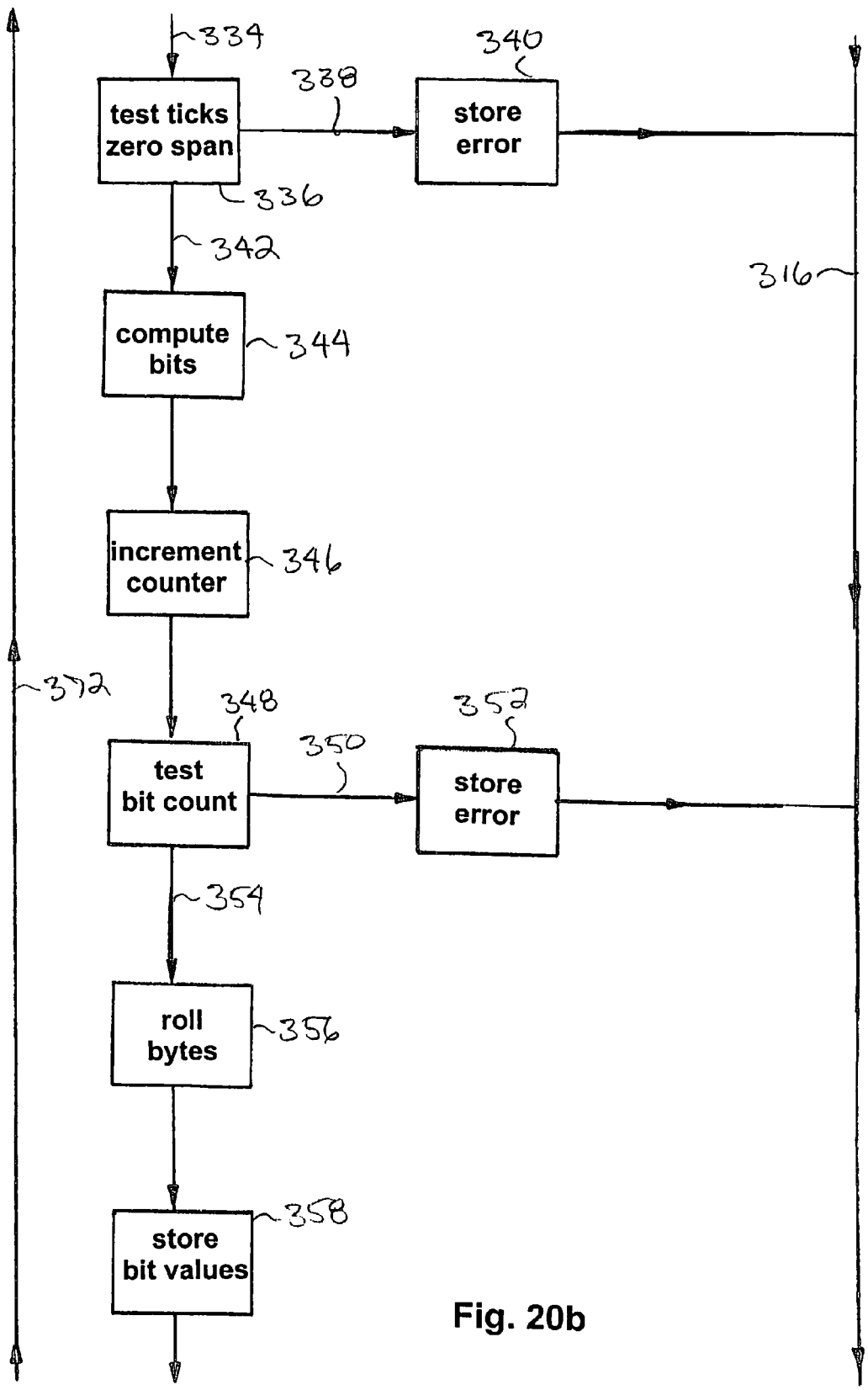
Figure 20C:
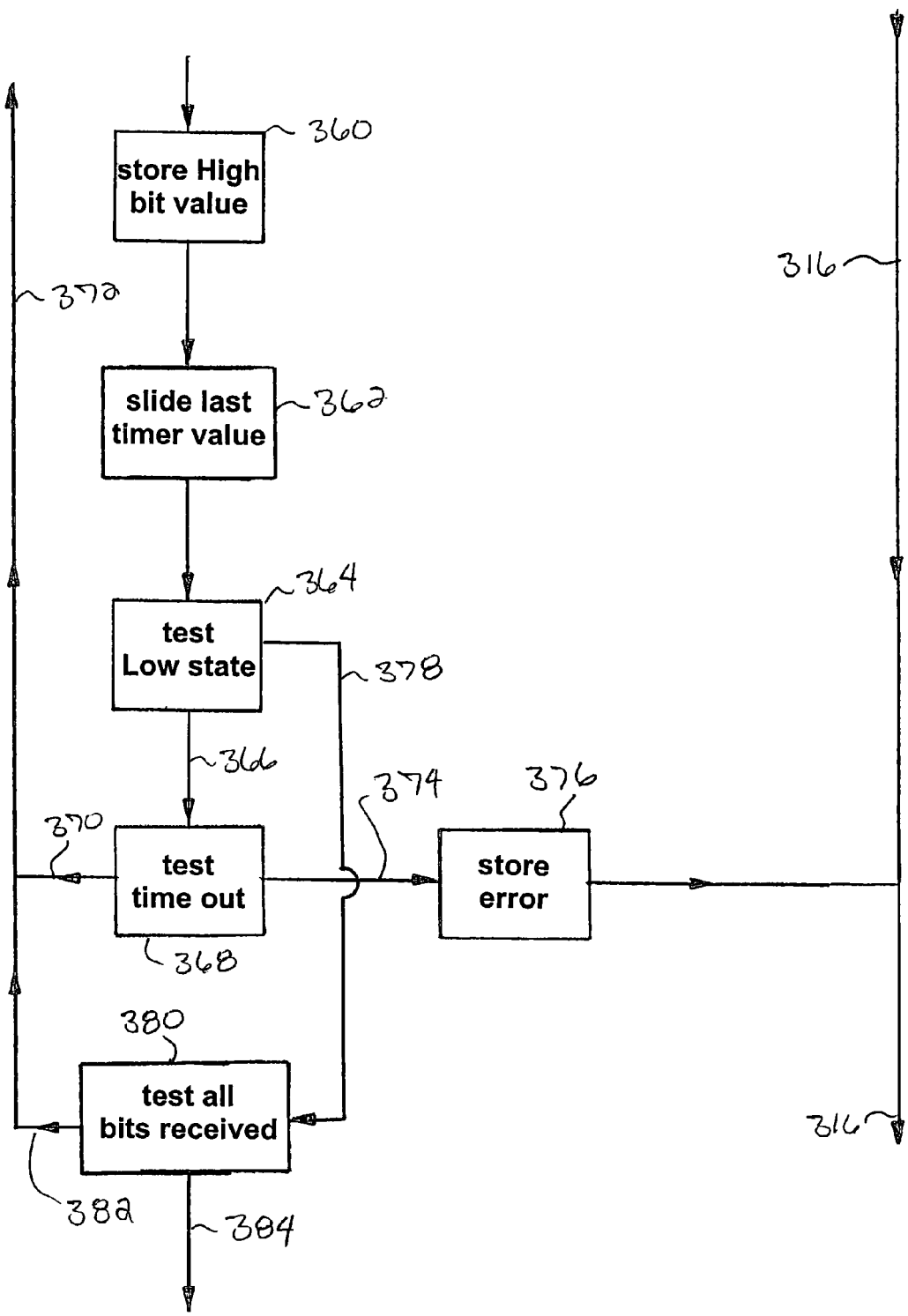

With reference to FIG. 20, the main receiver routine 194 samples 304 signals received by the receiver 14 and first queries 306 whether the bit state is high. If the bit state is not high 308, the micro-controller queries 310 whether the timeout period has been reached while seeking the high bit (TICKS PER ZERO SPAN). If the timeout period has been reached 312, the micro-controller stores 314"2" to Frame Err and exits 316 to the receiver idle routine 188. If the timeout period has not been reached 318, the micro-controller samples 304 the signal. If the bit state is high 320, the micro-controller saves 322 the tick count when the high state was detected (variable cur_t); obtains 324 the period, in timer #1 tick counts, between the last two high bits (set variable lap_t); and counts 326 the number of CPU cycles used between first detection of active high state and seekLow. The CPU cycles are counted to reduce the seekLow wait time, discussed below, and to more accurately find collision bits. Next the micro-controller queries 328 if lap_t<6 ticks. If lap_J is less than 6 ticks 330, the micro-controller stores 332"3" to Frame Err and exits 316 to the receiver idle routine 188. If lap_t is not less than 6 ticks 334, the micro-controller query 336 whether lap_j>TICKS_PER_ZERO_SPAN. If lapped is greater than TICKS_PER_ZERO_SPAN 338, the micro-controller stores 340"4" to Frame Err and exits 316 to the receiver idle routine 188. If lapped is not greater than TICKS_PER_ZERO_SPAN 342, the micro-controller computes 344 the number of received bits based on the elapsed time between high bits (rev_bits=lapped/8). The micro-controller then increments 346 the frame bit counter (frameBitCnt+=rcv_bits) and queries 348 whether too many bits have been received (frameBitCnt>BITS_PER_FRAME). If too many bits have been received 350, the micro-controller stores 352"5" to Frame Err and exits 316 returns to the receiver idle routine 188. If too many bits have not been received 354, the micro-controller rolls 356 the received bits, preferably the micro-controller moves entire 8 bit bytes to reduce single bit roll loops. This is necessary to reduce CPU cycles for long ZERO patterns. The number of CPU cycles used to shift bytes are counted in this loop process and the variable "reduceCycleCnt" is incremented at 17 CPU cycles per byte. Next, the micro-controller saves 358 the bit values by rolling carry flag into "code" word, unless there is only one bit, by counting the number of CPU cycles used to shift bytes and incrementing the variable "reduceCycleCnt" at 12 CPU cycles per bit. Next, the micro-computer saves 360 the high bit value and the stop bit, and then slides 362 the last timer value (variable "last_t=cur_t). The micro-computer then tests 364 for Low bit state. If a Low state is not detected 366, the micro-controller tests 368 whether it has timed out while seeking the Low state. If the micro-controller has not timed out 370, it returns 372 to sample 304 the signal. Accordingly, 254 CPU cycles are available to complete the bit pattern calculation discussed above. If the micro-controller has timed out 374 while still seeking the low state, the micro-controller stores 376 "%" of the bit collision type to Frame Err and exits 316 to the receiver idle routine 188. If a Low state is detected 378, the micro-controller queries 380 whether all bits have been received, including start and stop bits. If all bits have not been received 382, the micro-controller returns 372 to the beginning of the main receiver routine and samples 304 the signal.

If all bits have been received, the micro-controller exits 384 the main receiver routine 194 and initiates the error check routine 196.

Figure 21:
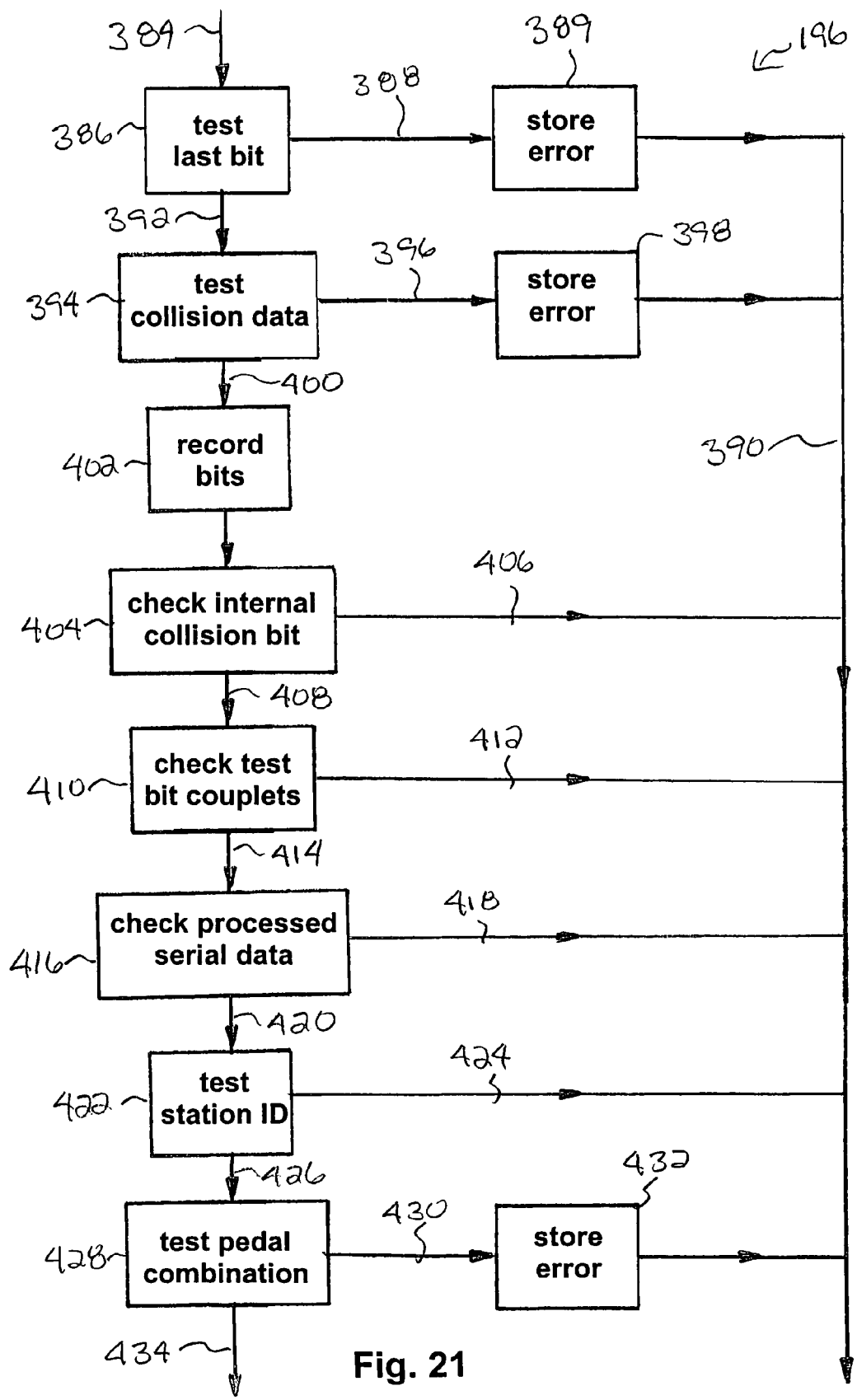
FIG. 21 is a flow diagram of the receiver operating system error check routine.

With reference to FIG. 21, the error check routine 196 starts by the micro-controller querying 386 whether the last bit was the high "stop bit". If the last bit was the high stop bit 388 (frameBitCnt!=BITS_PER_FRAME) the micro-controller stores 389"5" to Stop Bit Error and exits 390 the error check routine 196 and returns to the receiver idle routine 188. If the last bit was not the high stop bit 392, the micro-controller queries 394 whether the data is collision data. If the data is collision data 396 (High state encountered in TICKS_PER_ZERO_SPAN period) the micro-controller stores 398"7" to Collision Error and exits 390 the error check routine 196 and returns to the receiver idle routine 188. If the data is not collision data 400, the micro-controller records 402 all of the bits in the frame and then conducts 404 internal collision bit checking. Detection of a perfectly aligned collision is done by checking if more than on station bit is active, each station having its own bit. If an internal collision bit is detected 406, the micro-controller exits 390 the error check routine 196 and returns to the receiver idle routine 188. If an internal collision bit is not detected 408, the micro-controller checks 410 other internal collision test bit couplets. If both "High-Low" and "Low-High" couplets are not detected 412, the micro-controller exits 390 the error check routine 196 and returns to the receiver idle routine 188. If both "High-Low" and "Low-High" couplets are detected 414, the micro-controller checks 416 the processed serial data that has been received. First, the micro-controller calculates a preliminary CRC value from the data that has been received, and then applies the station dependent constants and the hard-coded OEM company code to this value to obtain a CRC 16 value. The micro-controller then compares the CRC 16 value to the CRC received in the payload. If the values do not match 418, the micro-controller exits 390 the error check routine 196 and returns to the receiver idle routine 188. If the values match 420, the micro-controller tests 422 that the transmitter station ID matches the receiver station ID set in the receiver dipswitches. If the dual station dipswitch is set, then the next logical received station ID must also match. If the station IDs do not match 424, the micro-controller exits 390 the error check routine 196 and returns to the receiver idle routine 188 without any pedal switch control actions. If the station IDs match 426, the micro-controller tests 428 whether the pedal combinations are valid. If pedal switch 2 is active and not pedal switch 1 or if pedal switch 4 is active and not pedal switch 3 430, then the micro-controller sets 432 error="P", exits 390 the error check routine 196, and returns to the receiver idle routine 188. If the pedal combinations are valid, the micro-controller exits 434 the error check routine 196 and initiates the return to receiver idle routine 198, where the micro-controller effects the valid received pedal states to the latched output port.

Figure 22:
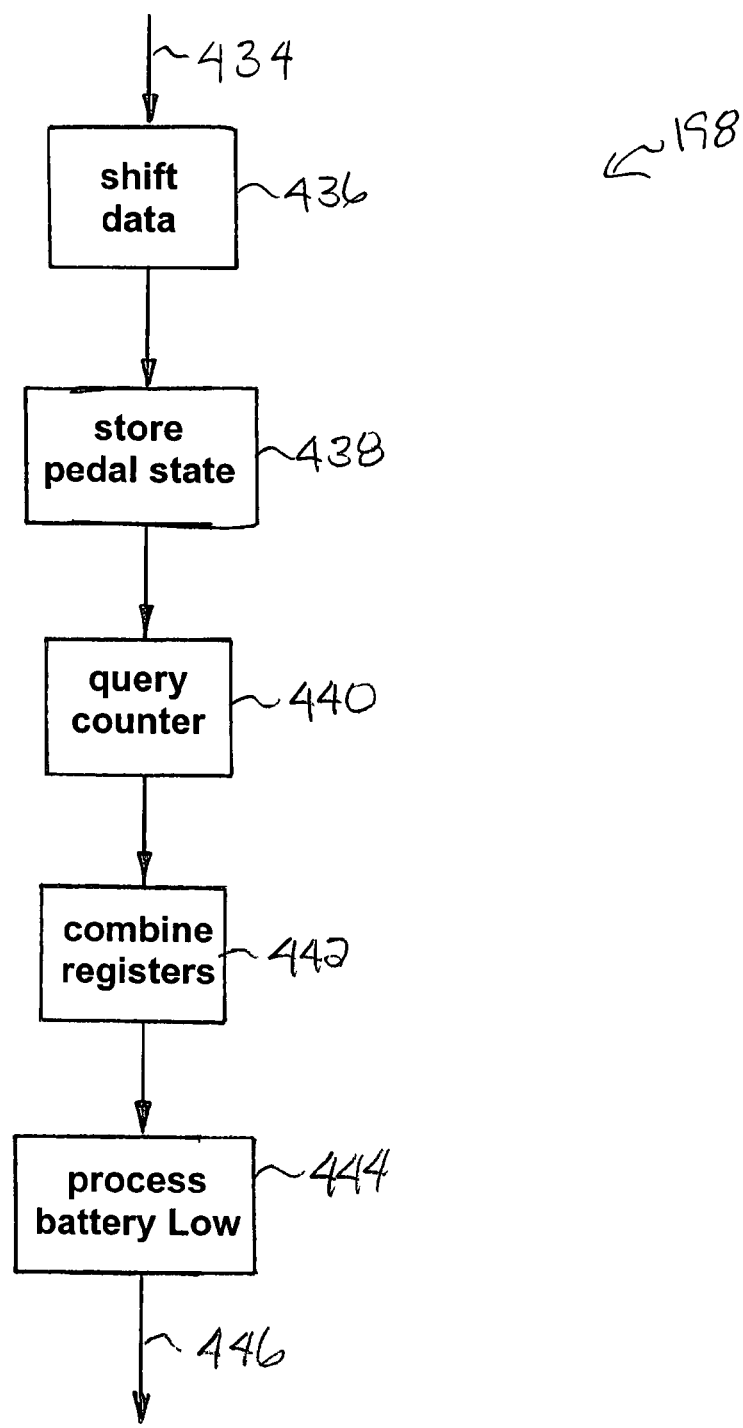
FIG. 22 is a flow diagram of the receiver operating system return to receiver idle routine.

With reference to FIG. 22, the return to receiver idle routine 198 starts by the micro-controller shifting 436 the data to set proper bit position on output Port B. Then the micro-controller saves 438 the pedal state for combined (dual station) output latching, queries 440 the failsafe time out counter, and combines 442 the dual station registers onto the output port latch. Then the micro-controller processes 444 the transmitter Battery Low data bit, and exits 446 to the receiver idle routine 188.

The receiver 14 can accept switching directives from two transmitters 12. This is setup on the receiver 14 using a dipswitch titled 'dual receive mode'. The logic to accomplish this 'dual receive mode' requires two independent 'fail safe timeout' counters. Valid inbound data from each station is logically or'ed together, and the result is put to the output port. For example, if transmitter A has switch #1 on, and transmitter B has switch #3 on, then the receiver will output switch #1 and 3 active.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A wireless foot control system comprising:
   at least one transmitter including
      a medium generator for emitting a communication medium;
      a power supply having
         a power source,
         a capacitor bank having a discharge current capacity sufficient to power the medium generator, and
         a current limiter, connecting the power source to the capacitor bank, the current limiter charging the capacitor bank from the power source over a period of time; and
      at least one foot pedal for selectively energizing the medium generator from the capacitor bank and
   a receiver including
      a medium collector for collecting the emitted medium; and
      an electronic circuit including
         a converter for converting the collected medium to an input control signal and
         a microprocessor in communication with the converter, the microprocessor having an operating system for generating an output control signal commensurate with the input control signal.

2. The wireless foot control system of claim 1 wherein the medium generator is a plurality of infrared light-emitting diodes arranged to emit an evenly distributed infrared light wave pattern and the medium collector is a plurality of photodiodes that are active in the infrared wavelength.

3. The wireless foot control system of claim 2 wherein the medium generator is composed of ten infrared light-emitting diodes arranged in a circular pattern and the medium collector is composed of six photodiodes arranged in a circular pattern.

4. The wireless foot control system of claim 1 wherein the system includes four or less transmitters.

5. A method for controlling a piece of equipment with a wireless foot control system, the foot control system comprising a receiver and at least one transmitter; the transmitter including a medium generator, a microprocessor having an operating system, and at least one foot pedal; the receiver including a medium collector and a microprocessor having an operating system, the method comprising the steps of:
   transmitting bounded randomized data packets indicative of actuation of the transmitter by
      depressing the at least one foot pedal to actuate the transmitter microprocessor,
      the transmitter operating system generating a control signal for the medium generator,
      the control signal energizing the medium generator to emit a communication medium defining the data packets;
   generating an output control signal for controlling the piece of equipment by
      collecting the emitted communication medium with the medium collector, examining the data packets for errors and
generating an output control signal for valid data packets.

6. The method of claim 5 wherein the step of generating a control signal for the medium generator comprises dividing a 2000 ms cycle time into 32 hop slots by
assigning a period base to each hop slot based on a setting of a microprocessor dip switch;
generating a random delay for each hop slot, the delay being bounded in a range of the assigned period base; and
normalizing the delay.

7. The method of claim 6 wherein the step of generating a random delay includes seeding the random generator with a customer code and the assigned station number.

8. The method of claim 6 wherein the normalized delay is equal to period base of the previous hop slot minus the selected delay period of the previous hop slot plus the selected delay period of the current hop slot.

9. The method of claim 5 wherein the step of examining the data packets for errors comprises:
examining each data packet for collisions and
examining each data packet for validity.

10. The method of claim 9 wherein each data packet has a bit period including an active high state followed by a low state gap, the high state and the low state each having a length, and the step of examining a data packet for collisions comprises comparing the high state length to a predetermined length.

11. The method of claim 10 wherein the transmitter operating system separates each prior data packet from each subsequent data packet with a trailing guard period having a predetermined length, and the step of examining a data packet for collisions also comprises comparing the trailing guard period between each prior data packet and each subsequent data packet with the predetermined trailing guard period length.

12. The method of claim 5 wherein the transmitter operating system includes:
an initialization routine for resetting the transmitter on initial energization;
a transmit wait routine for maintaining the transmitter in a wait state until a change in the pedal state is detected;
a transmit bit frame routine for transmitting the control signal when the transmit wait routine detects a change in the pedal state;
a test for off routine and a first packet test routine for returning the transmitter to the wait state on completion of transmission of the control signal.

13. The method of claim 12 wherein the transmit bit frame routine:
initially obtains a bit value
then queries whether the bit value is high;
if the bit value is high, the microprocessor transmits a HIGH bit to the medium generator;
if the bit value is not high, the microprocessor sends a LOW bit to the medium generator;
delays the gap period;
decrements bitCount;
queries whether all bits have been sent
if all of the bits have not been sent, the microprocessor loops back to obtains the bit value,
if all of the bits have been sent, the microprocessor exits the transmit 32 bit frame routine and initiates the test for off routine.

14. The method of claim 5 wherein the receiver operating system includes:

an initialization routine for resetting the transmitter on initial energization;
a receiver idle routine for maintaining the receiver in a wait state until a "start bit" (low to high transition) is received;
a start bit receipt routine;
a verification routine;
a main receiver routine;
an error check routine; and
a return to receiver idle routine.

15. The method of claim 14 wherein the start bit receipt routine:
determines whether the a failsafe timer has timed-out;
if the failsafe timer has timed-out, the micro-controller queries whether the idle period has been met;
if the idle period has not been met, the micro-controller exits the start bit receipt routine and restarts the receiver idle routine,
if the idle period has been met, the micro-controller queries whether a high state has been encountered,
if the failsafe timer has not timed-out, the micro-controller queries whether a high state has been encountered;
if a high state has not been encountered, the micro-controller loops back to the beginning of the start bit receipt routine;
if a high state has been encountered
the micro-controller initializes the timer count at the "start bit" leading edge, and
seeks the end of the start bit;
if the end of the start bit has been encountered
the micro-controller saves the timer tick count when the low state was detected,
exits the start bit receipt routine, and
initializes the start bit verification routine;
if the end of the start bit has not been encountered the micro-controller saves "0" to Frame error, exits the start bit receipt routine, and returns to the receiver idle routine.

16. The method of claim 14 wherein the start bit verification routine:
tests the start bit width;
if the start bit width is too short
the micro-controller saves "1" to IR Glitch Error,
exits the start bit verification routine, and
returns to the receiver idle routine;
if the start bit width is not too short
the micro-controller sets the received bit count to 1,
counts the start bit in the frame bit counter,
exits the start bit verification routine, and
initiates the main receiver routine.

17. The method of claim 14 wherein the main receiver routine samples the control signal received by the receiver and
queries whether the bit state is high;
if the bit state is not high, the micro-controller queries whether the timeout period has been reached,
if the timeout period has been reached, the micro-controller exits to the receiver idle routine,
if the timeout period has not been reached the micro-controller resamples the signal;
if the bit state is high, the micro-controller tests the tick count;
if the tick count is less than a predetermined value, the micro-controller exits to the receiver idle routine;
if the tick count is not less than the predetermined value, the micro-controller tests the ticks zero span;

if the ticks zero span is greater than a predetermined value, the micro-controller exits to the receiver idle routine;

if the ticks zero span is not greater than the predetermined value, the micro-controller tests the bit count;

if the bit count is greater than a predetermined value, the micro-controller exits to the receiver idle routine;

if the bit count is not greater than the predetermined value, the micro-controller rolls the received bits, saves the bit values, saves the high bit value and the stop bit, slides the last timer value, and tests for Low bit state;

if a Low state is not detected, the micro-controller tests whether it has timed out while seeking the Low state, if the timeout period has been reached, the micro-controller exits to the receiver idle routine, if the timeout period has not been reached the micro-controller resamples the signal;

if a Low state is detected, the micro-controller queries whether all bits have been received;

if all bits have not been received, the micro-controller resamples the signal; and if all bits have been received, the micro-controller exits the main receiver routine and initiates the error check routine.

18. The method of claim 14 wherein the error check routine queries whether the last bit was the high "stop bit";

if the last bit was the high stop bit, the micro-controller exits the error check routine and returns to the receiver idle routine if the last bit was not the high stop bit, the micro-controller queries whether the data is collision data;

if the data is collision data, the micro-controller exits the error check routine and returns to the receiver idle routine;

if the data is not collision data, the micro-controller records all of the bits in the frame and conducts internal collision bit checking if an internal collision bit is detected, the micro-controller exits the error check routine and returns to the receiver idle routine;

if an internal collision bit is not detected, the micro-controller checks other internal collision test bit couplets;

if both "High-Low" and "Low-High" couplets are not detected, the micro-controller exits the error check routine and returns to the receiver idle routine;

if both "High-Low" and "Low-High" couplets are detected, the micro-controller checks the processed serial data that has been received if the values do not match, the micro-controller exits the error check routine and returns to the receiver idle routine if the values match, the micro-controller tests that the transmitter station ID matches the receiver station ID set in the receiver dipswitches if the station IDs do not match, the micro-controller exits the error check routine and returns to the receiver idle routine if the station IDs match, the micro-controller tests whether the pedal combinations are valid if the pedal combinations are not valid, then the micro-controller exits the error check routine and returns to the receiver idle routine if the pedal combinations are valid, the micro-controller exits the error check routine and initiates the return to receiver idle routine.

* * * * *